(12) United States Patent
Nurse et al.

(10) Patent No.: US 10,040,692 B2
(45) Date of Patent: Aug. 7, 2018

(54) SYSTEMS AND METHODS FOR INCREASING AMMONIA PRODUCTION

(71) Applicant: KELLOGG BROWN & ROOT LLC, Houston, TX (US)

(72) Inventors: Trevor Williams Nurse, Swansea (GB); Girishkumar Natvarbhai Patel, London (GB)

(73) Assignee: Kellogg Brown & Root LLC, Houston, TX (US)

( * ) Notice: Subject to any disclaimer, the term of this patent is extended or adjusted under 35 U.S.C. 154(b) by 185 days.

(21) Appl. No.: 14/638,689

(22) Filed: Mar. 4, 2015

(65) Prior Publication Data

US 2015/0251918 A1    Sep. 10, 2015

Related U.S. Application Data

(60) Provisional application No. 61/947,759, filed on Mar. 4, 2014.

(51) Int. Cl.
| | |
|---|---|
| *B01J 8/04* | (2006.01) |
| *C01C 1/04* | (2006.01) |
| *C01B 3/02* | (2006.01) |
| *C01B 3/38* | (2006.01) |
| *C01B 3/48* | (2006.01) |

(52) U.S. Cl.
CPC ............... *C01C 1/0458* (2013.01); *B01J 8/04* (2013.01); *C01B 3/025* (2013.01); *C01B 3/38* (2013.01); *C01B 3/48* (2013.01); *C01B 2203/0233* (2013.01); *C01B 2203/0244* (2013.01); *C01B 2203/0283* (2013.01); *C01B 2203/043* (2013.01); *C01B 2203/047* (2013.01); *C01B 2203/0415* (2013.01); *C01B 2203/0425* (2013.01); *C01B 2203/0445* (2013.01); *C01B 2203/0475* (2013.01); *C01B 2203/068* (2013.01); *C01B 2203/1017* (2013.01); *C01B 2203/1058* (2013.01); *Y02P 20/52* (2015.11)

(58) Field of Classification Search
USPC .......................................... 423/361; 422/148
See application file for complete search history.

(56) References Cited

U.S. PATENT DOCUMENTS

| | | | | |
|---|---|---|---|---|
| 3,615,200 A | * | 10/1971 | Konoki ................. | C01C 1/0476 422/148 |
| 2004/0042951 A1 | * | 3/2004 | Lippmann ............. | C01C 1/0405 423/361 |

* cited by examiner

*Primary Examiner* — Jennifer A Leung
(74) *Attorney, Agent, or Firm* — Gary Machetta (57) ABSTRACT

Systems and methods for producing ammonia. The system can include a first ammonia converter, a second ammonia converter, a product separator, and an ammonia recovery unit. The first ammonia converter can be adapted to react a syngas to produce a first ammonia product and a first purge gas. The second ammonia converter can be in fluid communication with the first ammonia converter and can be adapted to react the first purge gas to produce an effluent. The product separator can be in fluid communication with the second ammonia converter and can be adapted to separate the effluent to produce a second ammonia product and a second purge gas. The ammonia recovery unit can be in fluid communication with the product separator and can be adapted to separate at least a portion of the second purge gas to produce a third ammonia product and a third purge gas.

5 Claims, 2 Drawing Sheets

SYSTEMS AND METHODS FOR INCREASING AMMONIA PRODUCTION

CROSS-REFERENCE TO RELATED APPLICATION

This application claims priority to U.S. Provisional Patent Application No. 61/947,759, filed on Mar. 4, 2014, which is incorporated by reference herein.

BACKGROUND

Field

Embodiments disclosed generally relate to systems and methods for producing ammonia.

Description of the Related Art

Ammonia is commonly produced by reacting hydrogen and nitrogen in the presence of a catalyst. Synthesis gas or "syngas" is typically the source of the hydrogen and nitrogen. Syngas is a product produced by reforming a carbon containing material in the presence of steam and/or oxidant at high temperatures.

Hydrogen and nitrogen from the syngas are reacted in a reactor commonly referred to as an ammonia converter. Any unreacted components of the syngas are recovered and recycled to the ammonia converter. This is sometimes called "an ammonia synthesis loop." Make-up syngas is continuously added to the ammonia synthesis loop to provide hydrogen and nitrogen. Syngas typically contains inert components, such as argon, methane, water vapor, carbon dioxide, and carbon monoxide, which do not contribute to ammonia production, as well as excess hydrogen or nitrogen, that undesirably accumulate in the ammonia synthesis loop. There is a need, therefore, for improved systems and methods for producing ammonia.

DETAILED DESCRIPTION

Systems and methods for producing ammonia are provided. The system can include a first ammonia converter, a second ammonia converter, a product separator, and an ammonia recovery unit. The first ammonia converter can be adapted to react a syngas that includes hydrogen and nitrogen to produce a first ammonia product and a first purge gas. The first purge gas can include nitrogen, hydrogen, and argon. The second ammonia converter can be in fluid communication with the first ammonia converter and can be adapted to react the first purge gas to produce an effluent that can include ammonia and argon. The product separator can be in fluid communication with the second ammonia converter and can be adapted to separate the effluent to produce a second ammonia product that can include ammonia and a second purge gas that can include ammonia and argon. The ammonia recovery unit can be in fluid communication with the product separator and can be adapted to separate at least a portion of the second purge gas to produce a third ammonia product that can include ammonia and a third purge gas that can include argon.

Figure 1:
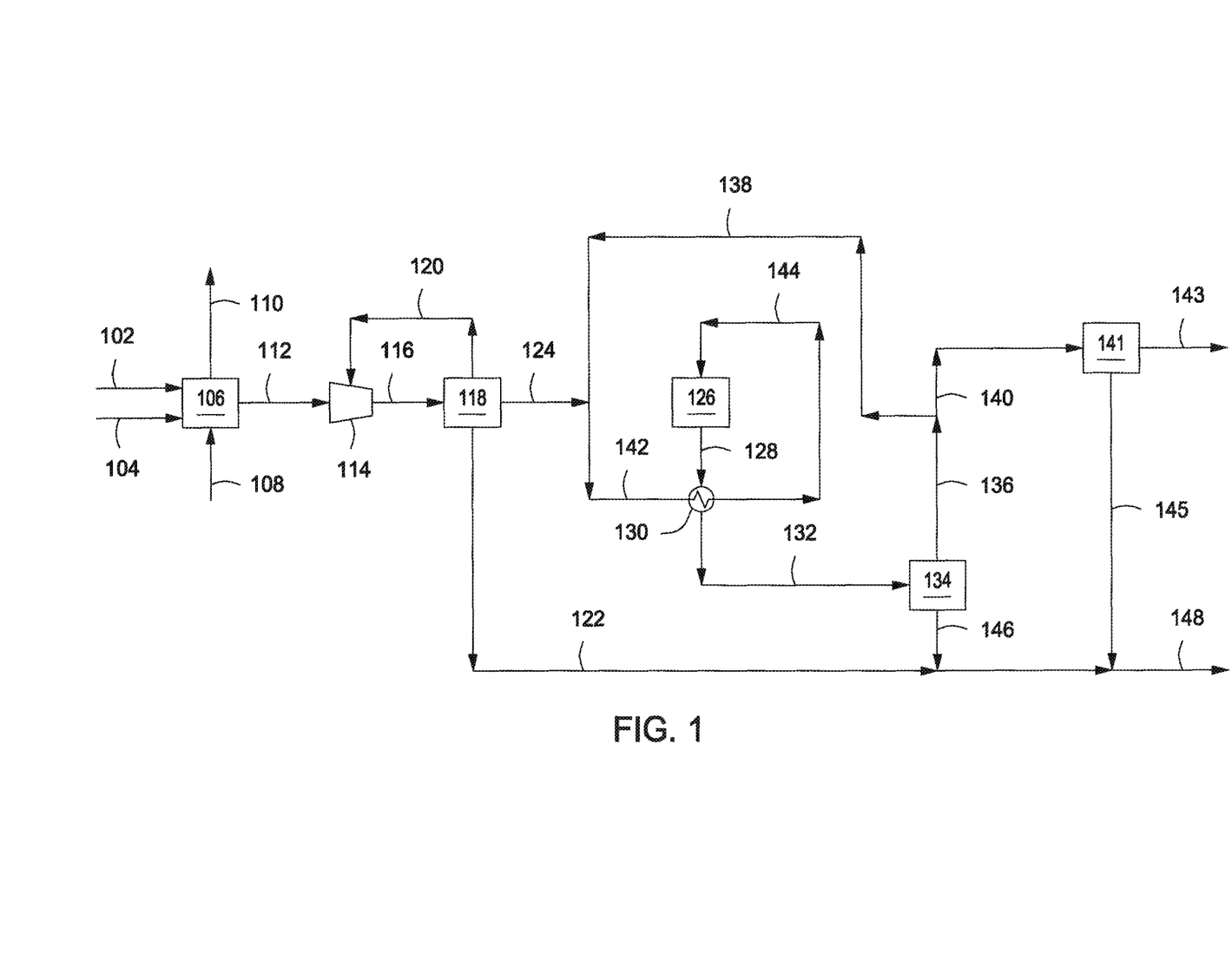
FIG. 1 depicts a schematic of an illustrative system for producing ammonia, according to one or more embodiments described.

FIG. 1 depicts an illustrative system 100 for producing ammonia, according to one or more embodiments. The system 100 can include one or more syngas preparation units 106, one or more compressors 114, one or more first ammonia converter 118, one or more second ammonia converters 126, one or more heat exchangers 130, and one or more product separators 134. The system 100 can optionally include one or more ammonia recovery units 141. One or more hydrocarbon lines 102, one or more oxidant lines 104, and/or one or more steam lines 108 can be in fluid communication with the syngas preparation unit 106. The syngas preparation unit 106 can be configured to produce a syngas via line 112 and/or carbon dioxide via line 110.

The hydrocarbon via line 102 can include one or more liquid hydrocarbons, one or more gaseous hydrocarbons, one or more solid hydrocarbons, or any mixture thereof. In one or more embodiments, the hydrocarbon via line 102 can include methane, ethane, propane, butane, or any mixture thereof. For example, the hydrocarbon in line 102 can include about 30 vol %, about 50 vol %, or about 75 vol % to about 95 vol %, about 99 vol %, or about 99.9 vol % of methane. The hydrocarbon via line 102 can also include $C_2$, $C_3$, and heavier hydrocarbons. In one or more embodiments, the hydrocarbon in line 102 can be at a pressure of about 700 kPa, about 1,000 kPa, or about 1,400 kPa to about 4,000 kPa, about 4,750 kPa, or about 5,500 kPa. Although not shown, the hydrocarbon via line 102 can be preheated prior to introduction to the syngas preparation unit 106. The hydrocarbon via line 102 can be preheated to a temperature of about 100° C., about 200° C., or about 400° C. to about 600° C. depending, at least in part, on the particular composition of the hydrocarbon in line 102.

The oxidant via line 104 can be air, including about 21 mol % oxygen, about 78 mol % nitrogen, and about 1 mol % argon. The oxidant via line 104 can be oxygen enriched air, nitrogen enriched air, or nitrogen lean air, e.g., less than 5 mol % nitrogen. The pressure of the oxidant via line 104 can be about 700 kPa, about 1,000 kPa, or about 1,400 kPa to about 4,000 kPa, about 4,750 kPa, or about 5,500 kPa. Although not shown, the oxidant via line 104 can be preheated to a temperature from a low of about 250° C., about 300° C., or about 400° C. to a high of about 500° C., about 600° C., or about 650° C. or more.

Steam via line 108 can be introduced to the syngas preparation unit 106 in conjunction with or separate from the hydrocarbon via line 102. The steam via line 108 and/or with the hydrocarbon via line 102 can be introduced to the syngas preparation unit 106 for at least the purposes of reforming at least a portion of the hydrocarbon via line 102 to produce at least a portion of the syngas via line 112. In one or more embodiments, the molar ratio of steam-to-carbon, e.g., in lines 108 and 102, respectively, can be about 2.5:1 to about 4:1, about 2.5:1 to about 3.5:1, or about 3:1 to about 4:1. In one or more embodiments, the pressure of the steam in line 108 can be about 700 kPa, about 1,000 kPa, or about 1,400 kPa to about 4,000 kPa, about 4,750 kPa, or about 5,500 kPa. Depending on the particular syngas preparation unit 106, the steam via line 108 and/or the oxidant via line 104 can be omitted. For example, the syngas preparation unit 106 can be or include a steam reformer and the hydrocarbon via line 102 and the steam via line 108 can be introduced to the steam reformer. In another example, the syngas preparation unit can be or include an autothermal reformer and the hydrocarbon via line 102 and the oxidant via line 104 can be introduced to the autothermal reformer. In another example, the reformer 106 can be or include one or more steam reformers, one or more autothermal reformers, one or more gasifiers, one or more partial oxidation reactors, one or more catalytic partial oxidation reactors, or any combination thereof.

The syngas in line 112 can include nitrogen, hydrogen, methane, oxygen, argon, or any mixture thereof. The syngas in line 112 can have any nitrogen and/or hydrogen concentration. For example, the syngas in line 112 can have a hydrogen-to-nitrogen ("$H_2:N_2$") molar ratio of about 2:1 to about 4:1 or about 2.2:1 to about 3.2:1. In another example, the hydrogen-to-nitrogen molar ratio can be about 2.8:1 to about 3.2:1, about 2.9:1 to about 3.2:1 or about 3:1 to about 3.1:1. Illustrative systems and methods for producing the syngas in line 112 can include those discussed and described in U.S. Pat. Nos. 7,642,377; 7,722,690; 7,932,296; 8,273,139; 8,617,270; 8,481,786; and 8,889,037 and U.S. Patent Application Publication Nos.: 2008/0155899; 2009/0151250; 2009/0188165; 2010/00016635; 2010/0076222; 2010/0132259; 2011/0206594; 2013/0165535; and 2015/0044121.

The syngas in line 112 can have a hydrogen concentration of about 50 mol %, about 60 mol %, about 65 mol %, or about 70 mol % to about 75 mol %, about 80 mol %, about 85 mol %, or about 90 mol %. The syngas in line 112 can have a nitrogen concentration of about 10 mol %, about 15 mol %, about 20 mol %, or about 22 mol % to about 25 mol %, about 30 mol %, about 35 mol %, or about 40 mol %. The syngas in line 112 can have a methane concentration of about 0.001 mol %, about 0.005 mol %, about 0.01 mol %, or about 0.05 mol % to about 0.1 mol %, about 0.5 mol %, about 1 mol %, or about 2 mol %. The syngas in line 112 can have concentration of oxygen containing compounds, e.g., water vapor, carbon monoxide, and carbon dioxide of about 0.001 mol %, about 0.005 mol %, about 0.01 mol %, or about 0.05 mol % to about 0.1 mol %, about 0.5 mol %, about 1 mol %, or about 2 mol %. The syngas via line 112 can have an argon concentration of about 0.001 mol %, about 0.005 mol %, about 0.01 mol %, or about 0.05 mol % to about 0.1 mol %, about 0.5 mol %, about 1 mol %, or about 2 mol %.

At least a portion of the syngas via line 112 can be introduced to the compressor 114 to produce a compressed syngas via line 116. For example, a first portion of the syngas can be introduced to the compressor 114 and a second portion of the syngas can bypass (not shown) the compressor 114 and can be mixed with a first purge gas in line 124 (not shown). In another example, the syn gas via line 112 can be introduced to the compressor 114 and to produce a compressed syngas via line 116 and a first portion of the compressed syngas via line 116 can be introduced to the first ammonia reactor 118 and a second portion can be mixed with the first purge gas in line 124 (not shown). In another example, all of the syngas via line 112 can bypass the compressor 114 (not shown). As such, the compressor 114 can be an optional component of the system 100.

The syngas in line 112 can be at a temperature of about −10° C., about 0° C., about 5° C., about 10° C., or about 20° C. to about 25° C., about 30° C., about 35° C., about 40° C., or about 50° C. when introduced to the compressor 114. The syngas via line 112 can be at a pressure of about 100 kPa, about 500 kPa, about 1,000 kPa, about 1,500 kPa, or about 2,000 kPa to about 2,500 kPa, about 3,000 kPa, about 4,000 kPa, about 5,000 kPa, or about 10,000 kPa when introduced to the compressor 114. The compressor 114 can be or include any number of compressors arranged in parallel and/or in series. For example, the compressor 114 can include 1, 2, 3, 4, 6, 8, or more compressors. The compressed syngas via line 116 can be at a temperature of about 30° C. to about 180° C. and at pressure of about 2,000 kPa to about 30,000 kPa when recovered from the compressor 114.

The compressed syngas via line 116 can include nitrogen, hydrogen, methane, ammonia, oxygen compounds, argon, or any mixture thereof. The compressed syngas via line 116 can have any nitrogen and/or hydrogen concentration. The composition of the compressed syngas via line 116 can be the same as or different from that of the syngas via line 112. For example, the compressed syngas via line 116 can have a hydrogen-to-nitrogen molar ratio of about 2:1 to about 4:1 or about 2.2:1 to about 3.2:1. In another example, the compressed syngas via line 116 can have a hydrogen-to-nitrogen molar ratio of about 2.9:1, about 3:1, about 3.1:1, or about 3.2:1.

The compressed syngas via line 116 can have a hydrogen concentration from a low of about 40 mol %, 50 mol %, about 60 mol %, about 65 mol %, or about 70 mol % to a high of about 75 mol %, about 80 mol %, about 85 mol %, or about 90 mol %. The compressed syngas via line 116 can have a nitrogen concentration from a low of about 10 mol %, about 15 mol %, about 20 mol %, or about 22 mol % to a high of about 25 mol %, about 30 mol %, about 35 mol %, or about 40 mol %. The compressed syngas via line 116 can have a methane concentration from a low of about 0.001 mol %, about 0.05 mol %, about 0.01 mol %, or about 0.1 mol % to a high of about 0.5 mol %, about 1 mol %, about 2 mol %, about 5 mol %, about 10 mol %, or about 15 mol %. The compressed syngas via line 116 can have an oxygen compound concentration, e.g., oxygen, carbon monoxide, carbon dioxide, and/or water, from a low of about 0.001 mol %, about 0.005 mol %, about 0.01 mol %, or about 0.05 mol % to a high of about 0.1 mol %, about 0.5 mol %, about 1 mol %, or about 2 mol %. The compressed syngas via line 116 can have an argon concentration from a low of about 0.001 mol %, about 0.05 mol %, about 0.01 mol %, or about 0.1 mol % to a high of about 0.5 mol %, about 1 mol %, about 2 mol %, about 3 mol %, about 5 mol %, or about 7 mol %. The compressed syngas via line 116 can have an ammonia concentration from a low of about 0.001 mol %, about 0.05 mol %, about 0.01 mol %, or about 0.1 mol % to a high of about 0.5 mol %, about 1 mol %, about 2 mol %, about 5 mol %, about 7 mol %, about 10 mol %, or about 15 mol %. The compressed syngas via line 116 can be introduced to the first ammonia converter 118 to produce a first ammonia product 122, a first recycle gas via line 120, and the first purge gas via line 124.

The compressed syngas via line 116 and/or the syngas in line 112 (not shown) can be introduced to the first ammonia converter 118 at a temperature of about 30° C. to about 180° C. and a pressure of about 2,000 kPa to about 30,000 kPa. The first ammonia converter can be operated at a temperature of about 100° C. to about 520° C. and a pressure of about 2,000 kPa to about 30,000 kPa. The first ammonia converter 118 can be or be included in an ammonia synthesis loop. The first ammonia converter 118 can be or include conventional single or multi-pass converters using one or more types of catalyst. The catalyst can have a bulk density of about 3,000 kg/m$^3$ to about 4,000 kg/m$^3$, or about 3,200 kg/m$^3$ to about 3,400 kg/m$^3$. For example, the catalyst can have a bulk density of about 3,300 kg/m$^3$. The catalyst can have a loaded volume from a low of about 10 m$^3$, about 20 m$^3$, about 30 m$^3$, or about 40 m$^3$ to a high of about to about 60 m$^3$, about 70 m$^3$, about 80 m$^3$, about 90 m$^3$, or about 100 m$^3$. The first ammonia converter 118 can convert about 5% to about 50%, or about 10% to about 25% of the syngas to ammonia. For example, the first ammonia converter 118 can produce ammonia at a conversion rate of about 10% to about 25% per pass through the first reactor. The first ammonia converter 118 can be single-pas converter or a multi-pass converter using one or more magnetite catalysts, one or more noble metal catalysts, or one or more catalysts based on or that includes ruthenium, such as the ruthenium-based KAAP catalyst available from KBR. One or more higher activity, noble metal, catalysts can allow the use of lower pressures in the ammonia synthesis loop, thereby permitting use of a single barrel ammonia compressor (not shown). The ammonia converter 118 can convert from a low of about 70%, about 75%, or about 80% to a high of about 85%, about 90%, or about 95% of the syngas introduced via line 116 to the first ammonia product. For example, the ammonia converter 118 can be a multi-pass or "loop" converter that can produce the first ammonia product via line 122 at a conversion rate of about 70% to about 90% of the syngas.

The first ammonia converter 118 can also include any reactor intended to operate at elevated pressures and/or temperatures to convert at least a portion of a feed gas including nitrogen and hydrogen, e.g., a purified syngas, to ammonia. The first ammonia converter 118 can include one or more one or more of the "Split-Flow Ammonia Converters," one or more of the "Isothermal Ammonia Converters," and/or one or more of the "Horizontal Ammonia Converters, discussed and described in U.S. Pat. Nos. 7,081,230; 6,171,570; and 6,132,687, respectively.

The first recycle gas via line 120 can be withdrawn from the first ammonia converter 118 and recycled to the compressor 114, the syngas in line 112 (not shown), and/or the compressed syngas in line 116 (not shown). The first recycle gas via line 120 can be at a temperature of about 0° C., about 5° C., about 15° C., about 20° C., or about 25° C. to about 35° C., about 40° C., about 45° C., about 50° C., or about 60° C. and a pressure of about 2,000 kPa, about 4,000 kPa, about 8,000 kPa, about 10,000 kPa, or about 12,000 kPa to about 14,000 kPa, about 16,000 kPa, about 20,000 kPa, 25,000 kPa, or about 30,000 kPa.

The first recycle gas in line 120 can have a hydrogen concentration from a low of about 40 mol %, 50 mol %, about 60 mol %, about 65 mol %, or about 70 mol % to a high of about 75 mol %, about 80 mol %, about 85 mol %, or about 90 mol %. The first recycle gas in line 120 can have a nitrogen concentration from a low of about 10 mol %, about 15 mol %, about 20 mol %, or about 22 mol % to a high of about 25 mol %, about 30 mol %, about 35 mol %, or about 40 mol %. The first recycle gas in line 120 can have a methane concentration from a low of about 0.001 mol % to a high of about 20 mol %, about 0.1 mol % to about 10 mol %, about 0.1 mol % to about 5 mol %, or about 0.1 mol % to about 1 mol %. The first recycle gas in line 120 can have an argon concentration from a low of about 0.001 mol %, about 0.05 mol %, about 0.01 mol %, or about 0.1 mol % to a high of about 0.5 mol %, about 1 mol %, about 2 mol %, or about 5 mol %. The first recycle gas in line 120 can have an ammonia concentration from a low of about 0.001 mol %, about 0.05 mol %, about 0.01 mol %, or about 0.1 mol % to a high of about 0.5 mol %, about 1 mol %, about 2 mol %, about 5 mol %, about 10 mol %, or about 15 mol %. For example, the first recycle gas in line 120 can have a hydrogen concentration of about 40 mol % to about 90 mol %, a nitrogen concentration of about 10 mol % to about 40 mol %, a methane concentration of about 0.02 mol % to about 20 mol %, an argon concentration of about 0.001 mol % to about 10 mol %, and an ammonia concentration of about 0.001 mol % to about 15 mol %. In another example, the first recycle gas in line 120 can have a hydrogen concentration of about 55 mol % to about 85 mol %, a nitrogen concentration of about 15 mol % to about 35 mol %, a combined methane and argon concentration of about 1 mol % to about 10 mol %, and an ammonia concentration of about 0.5 mol % to about 10 mol %. In another example, the first recycle gas in line 120 can have a hydrogen concentration of about 65 mol % to about 75 mol %, a nitrogen concentration of about 18 mol % to about 28 mol %, a combined methane and argon concentration of about 3 mol % to about 8 mol %, and an ammonia concentration of about 1 mol % to about 5 mol %.

The first ammonia product in line 122 can be at a temperature from a low of about −40° C., about −30° C., or about −25° C. to a high of about −20° C., about −10° C., about 0° C., about 10° C., or about 25° C. and at a pressure from a low of about 2,000 kPa, about 4,000 kPa, about 8,000 kPa, about 10,000 kPa, or about 12,000 kPa to a high of about 14,000 kPa, about 16,000 kPa, about 20,000 kPa, about 25,000 kPa, or about 30,000 kPa when recovered from the first ammonia converter 118.

The first ammonia product in line 122 can have an ammonia concentration from a low of about 90 mol %, about 95 mol %, or about 97 mol % to a high about 99 mol %, about 99.9 mol %, about 99.99 mol % or more. For example, the first ammonia product in line 122 can have an ammonia concentration of at least 90 mol %, at least 93 mol %, at least 95 mol %, or at least 97 mo % to a high of about 98 mol %, about 99 mol %, about 99.99 mol % or more. The first ammonia product in line 122 can have a hydrogen concentration from a low of about 0.001 mol %, about 0.05 mol %, about 0.01 mol %, or about 0.1 mol % to a high about 0.5 mol %, about 1 mol %, about 2 mol %, or about 5 mol %. The first ammonia product in line 122 can have a nitrogen concentration from a low of about 0.001 mol %, about 0.005 mol %, about 0.01 mol %, or about 0.05 mol % to a high about 0.1 mol %, about 0.5 mol %, about 1 mol %, or about 2 mol %. The first ammonia product in line 122 can have a methane concentration from a low of about 0 mol %, about 0.01 mol %, or about 0.05 mol % to a high about 0.07 mol % or about 0.1 mol %. The first ammonia product in line 122 can have an argon concentration from a low of about 0 mol %, about 0.01 mol %, or about 0.05 mol % to a high about 0.07 mol %, or about 0.1 mol %. The first ammonia product in line 128 can have an argon concentration from a low of about 0 mol %, about 0.01 mol %, or about 0.05 mol % to a high about 0.07 mol %, or about 0.1 mol %. For example, the first ammonia product in line 122 can have an ammonia concentration of at least 90 mol % to about 99.99 mol %, a hydrogen concentration of about 0.001 mol % to about 5 mol %, a nitrogen concentration of about 0.001 mol % to about 2 mol %, a methane concentration of about 0.0001 mol % to about 0.1 mol %, and an argon concentration of about 0.0001 mol % to about 0.1 mol %. In another example, the first ammonia product in line 122 can have an ammonia concentration of at least 95 mol %, a hydrogen concentration of up to about 5 mol %, a nitrogen concentration of up to about 2 mol %, a methane concentration of up to about 0.1 mol %, and an argon concentration of up to about 0.1 mol %.

The first purge gas in line 124 can be withdrawn from the first ammonia converter 118 at a temperature from a low of about −30° C., about −20° C., about −5° C., about 0° C., about 5° C., about 15° C., about 20° C., or about 25° C. to a high about 35° C., about 40° C., about 45° C., about 50° C., or about 60° C. and at a pressure from a low of about 2,000 kPa, about 4,000 kPa, about 8,000 kPa, about 10,000 kPa, or about 12,000 kPa to a high of about 14,000 kPa, about 16,000 kPa, about 20,000 kPa, about 25,000 kPa, or about 30,000 kPa.

The first purge gas via line 124 can have a hydrogen concentration from a low of about 40 mol %, about 50 mol %, about 60 mol %, about 65 mol %, or about 70 mol % to a high of about 75 mol %, about 80 mol %, about 85 mol %, or about 90 mol %. The first purge gas via line 124 can have a nitrogen concentration from a low of about 10 mol %, about 15 mol %, about 20 mol %, or about 22 mol % to a high of about 25 mol %, about 30 mol %, about 35 mol %, or about 40 mol %. The first purge gas via line 124 can have a methane concentration from a low of about 0.002 mol %, about 0.08 mol %, about 0.1 mol %, or about 0.2 mol % to a high of about 0.5 mol %, about 1 mol %, about 5 mol %, about 10 mol %, or about 15 mol %. The first purge gas via line 124 can have an argon concentration from a low of about 0.001 mol %, about 0.05 mol %, about 0.01 mol %, or about 0.1 mol % to a high of about 0.5 mol %, about 1 mol %, about 2 mol %, or about 5 mol %. The first purge gas via line 124 can have an ammonia concentration from a low of about 0.001 mol %, about 0.05 mol %, about 0.01 mol %, or about 0.1 mol % to a high of about 0.5 mol %, about 1 mol %, about 2 mol %, about 5 mol %, or about 15 mol %. For example, the first purge gas via line 124 can have a hydrogen concentration of about 40 mol % to about 90 mol %, a nitrogen concentration of about 10 mol % to about 40 mol %, a methane concentration of about 0.02 mol % to about 20 mol %, an argon concentration of about 0.001 mol % to about 10 mol %, and an ammonia concentration of about 0.001 mol % to about 15 mol %. In another example, the first purge gas via line 124 can have a hydrogen concentration of about 55 mol % to about 85 mol %, a nitrogen concentration of about 15 mol % to about 35 mol %, a combined methane and argon concentration of about 1 mol % to about 10 mol %, and an ammonia concentration of about 0.5 mol % to about 10 mol %. In another example, the first purge gas via line 124 can have a hydrogen concentration of about 65 mol % to about 75 mol %, a nitrogen concentration of about 18 mol % to about 28 mol %, a combined methane and argon concentration of about 3 mol % to about 8 mol %, and an ammonia concentration of about 1 mol % to about 5 mol %. In another example, the first purge gas via line 124 can have the same or substantially the composition as the first recycle via line 120.

The amount of the first purge gas via line 124 can be up to 60% of the amount of syngas via line 112. For example, the amount of the first purge gas via line 124 can be from a low of about 5%, about 10%, about 15%, about 20%, or about 25% to a high of about 40%, about 45%, about 50%, about 55%, or about 60% of the amount of syngas via line 112. In one specific example, if the amount of syngas via line 112 is about 1,765 tons per day, the amount of the first purge gas via line 124 can be from a low of about 88.25 tons per day (about 5%) to a high of about 1,059 tons per day (60%).

A weight ratio of the first ammonia product via line 122 to the first purge gas via line 124 can be about 15:1 to about 5:1, about 10:1 to about 4:1, about 5:1 to about 3:1, about 3:1 to about 1.5:1, or about 1.5:1 to about 3.5:1. The first purge gas via line 124 can include at least 1 wt %, at least 5 wt %, at least 25 wt %, at least 35 wt %, at least 45 wt %, at least 55 wt %, at least 75 wt %, at least 80 wt %, or at least 85 wt % of all material leaving the first ammonia converter 118. For example, the first purge gas via line 124 can include of about 1 wt % to about 3 wt %, about 2 wt % to about 7 wt %, about 5 wt % to about 95 wt %, about 61 wt % to about 90 wt %, or about 70 wt % to about 95 wt % of all material leaving the first ammonia converter 118.

The first purge gas via line 124 can be introduced to the second ammonia converter 126 to produce an effluent via line 128. A second recycle via line 128 can be mixed or otherwise combined with the first purge gas as in line 124 to produce a mixed feed or mixed gas via line 142. The second recycle via line 128 can be introduced separately to the second ammonia converter 126 (not shown). The first purge gas via line 124 and/or mixed gas via line 142 can be heated in the heat exchanger 130 prior to being introduced to the second ammonia converter 126. The first purge gas via line 124 and/or the mixed gas via line 142 can be introduced to the second ammonia converter 126 at a temperature from a low of about −30° C., about 0° C., about 25° C., about 30° C., about 35° C., about 40° C., or about 45° C. to a high of about 60° C., about 70° C., about 80° C., about 90° C., about 100° C., about 150° C., about 200° C., or about 300° C. The first purge gas via line 124 and/or mixed gas via line 142 can be introduced to the second ammonia converter 126 at a pressure of about 2,000 kPa to about 30,000 kPa. The second ammonia converter 126 can be operated at a temperature of about 20° C. to about 520° C. and a pressure of about 2,000 kPa to about 30,000 kPa. The second ammonia converter 126 can convert about 5% to about 99%, about 15% to about 85%, or about 20% to about 60% of the hydrogen and nitrogen in the first purge gas 124 or the first purge gas via line 124 combined with the second recycle in line 138 to ammonia. For example, the second ammonia converter 126 can produce the effluent via line 128 at a conversion rate of about 5% to about 99%.

The second ammonia converter 126 and/or the catalyst used therein can be the same, similar to, or different than the catalyst discussed and described above with reference to the first ammonia converter 118. For example, the second ammonia converter 126 can have the same internal components as that included in the first ammonia converter 118. The second ammonia converter 126 can be or can be included in an ammonia synthesis loop. The second ammonia converter 126 can be a single pass reactor or a multi-pass reactor. The second ammonia converter 126 can have the same or different internal components than the first ammonia converter 118.

The effluent via line 128 can be withdrawn from the second ammonia converter 126 at a temperature of about 30° C., about 50° C., about 70° C., about 90° C., or about 110° C. to about 130° C., about 150° C., about 170° C., about 190° C., or about 200° C. and a pressure of about 2,000 kPa, about 4,000 kPa, about 8,000 kPa, about 10,000 kPa, or about 12,000 kPa to about 13,000 kPa, about 15,000 kPa, about 20,000 kPa, about 25,000 kPa, or about 30,000 kPa.

The effluent via line 128 can have an ammonia concentration from a low of about 1 mol %, about 5 mol %, about 8 mol %, about 12 mol %, or about 15 mol % to a high of about 20 mol %, about 25 mol %, about 30 mol %, about 35 mol %, or about 50 mol %. The effluent via line 128 can have a hydrogen concentration from a low of about 20 mol %, about 25 mol %, about 35 mol %, or about 45 mol % to a high of about 55 mol %, about 70 mol %, about 75 mol %, or about 80 mol %. The effluent via line 128 can have a nitrogen concentration from a low of about 1 mol %, about 5 mol %, about 10 mol %, or about 15 mol % to a high of about 20 mol %, about 25 mol %, about 30 mol %, or about 40 mol %. The effluent via line 128 can have a methane concentration from a low of about 1 mol %, about 4 mol %, about 8 mol %, or about 10 mol % to a high of about 12 mol %, about 15 mol %, about 20 mol %, about 25 mol %, or about 35 mol %. The effluent via line 128 can have a methane concentration from a low of less than about 40 mol %, less than about 30 mol %, less than about 20 mol %, less than about 15 mol %, less than about 10 mol %, less than about 7 mol %, less than about 5 mol %, less than about 3 mol %, less than about 1 mol %, or less than about 0.5 mol %. The effluent via line 128 can have an argon concentration from a low of about 1 mol %, about 4 mol %, about 8 mol %, or about 10 mol % to a high of about 12 mol %, about 15 mol %, about 20 mol %, about 25 mol %, or about 35 mol %. The effluent via line 128 can have an argon concentration from a low of less than about 40 mol %, less than about 30 mol %, less than about 20 mol %, less than about 15 mol %, less than about 10 mol %, less than about 7 mol %, less than about 5 mol %, less than about 3 mol %, less than about 1 mol %, or less than about 0.5 mol %. The effluent via line 128 can have an ammonia concentration of less than about 40 mol %, less than about 30 mol %, less than about 20 mol %, less than about 15 mol %, less than about 10 mol %, less than about 7 mol %, less than about 5 mol %, less than about 3 mol %, or less than about 1 mol %. For example, the effluent via line 128 can have an ammonia concentration from a low of about 1 mol % to a high of about 40 mol %, a hydrogen concentration of about 20 mol % to about 80 mol %, a nitrogen concentration of about 1 mol % to about 40 mol %, a methane concentration of about 1 mol % to about 35 mol %, and an argon concentration of about 1 mol % to about 35 mol %. In another example, the effluent via line 128 can have an ammonia concentration from a low of about 5 mol % to a high of about 15 mol %, a hydrogen concentration of about 40 mol % to about 60 mol %, a nitrogen concentration of about 10 mol % to about 23 mol %, and a combined amount of methane and argon of about 15 mol % to about 30 mol %.

The effluent via line 128 can be introduced the heat exchanger 130 to produce a cooled effluent via line 132. For example, heat can be indirectly transferred within the heat exchanger 130 from the effluent in line 128 to the first purge gas in line 124 or the mixed gas in line 142. The cooled effluent via line 132 can be at a temperature of about −40° C. to about 50° C. The cooled effluent via line 132 can be at a pressure of about 2,000 kPa to about 30,000 kPa. The heated first purge gas and/or the heated mixed gas via line 144 can be at a temperature of about 100° C. to about 300° C. and a pressure of about 2,000 kPa to about 30,000 kPa. Although not shown, all or a portion of the mixed gas in line 142 can be introduced directly to the second ammonia synthesis converter 126 without being heated in the heat exchanger 130.

The cooled effluent via line 132 can be introduced to the product separator, 134 to produce the second recycle gas via line 136 and the ammonia product via line 146. The second recycle gas via line 136 can be recovered from the product separator 134 at a temperature of about −40° C. to about 50° C. and a pressure of about 2,000 kPa to about 30,000 kPa.

The second recycle gas via line 136 can have an ammonia concentration from a low of about 0.01 mol %, about 0.1 mol %, about 0.4 mol %, about 0.8 mol %, or about 1.5 mol % to a high of about 2 mol %, about 2.5 mol %, about 3 mol %, about 3.5 mol %, or about 15 mol %. The second recycle gas via line 136 can have a hydrogen concentration from a low of about 20 mol %, about 25 mol %, about 35 mol %, or about 45 mol % to a high of about 55 mol %, about 70 mol %, about 75 mol %, or about 80 mol %. The second recycle gas via line 136 can have a nitrogen concentration from a low of about 1 mol %, about 5 mol %, about 10 mo 1%, or about 15 mol % to a high of about 20 mol %, about 25 mol %, about 30 mol %, or about 40 mol %. The second recycle gas via line 136 can have a methane concentration from a low of about 1 mol %, about 4 mol %, about 8 mol %, or about 10 mol % to a high of about 12 mol %, about 15 mol %, about 20 mol %, about 25 mol %, or about 35 mol %. The second recycle gas via line 136 can have a methane concentration of less than about 40 mol %, less than about 30 mol %, less than about 20 mol %, less than about 15 mol %, less than about 10 mol %, less than about 7 mol %, less than about 5 mol %, less than about 3 mol %, less than about 1 mol %, or less than about 0.5 mol %. The second recycle gas via line 136 can have a methane concentration from about 0.1 mol % to about 44 mol %, about 5 mol % to about 22 mol %, about 8 mol % to about 18 mol %, or about 11 mol % to about 14 mol %. The second recycle gas via line 136 can have an argon concentration from a low of about 1 mol %, about 4 mol %, about 8 mol %, or about 10 mol % to a high of about 12 mol %, about 15 mol %, about 20 mol %, about 25 mol %, or about 35 mol %. The second recycle gas via line 136 can have an argon concentration of less than about 40 mol %, less than about 30 mol %, less than about 20 mol %, less than about 15 mol %, less than about 10 mol %, less than about 7 mol %, less than about 5 mol %, less than about 3 mol %, less than about 1 mol %, or less than about 0.5 mol %. The second recycle gas via line 136 can have an argon concentration of about 0.1 mol % to about 44 mol %, about 5 mol % to about 22 mol %, about 8 mol % to about 18 mol %, or about 11 mol % to about 14 mol %. For example, the second recycle gas via line 136 can have an ammonia concentration of about 0.01 mol % to about 15 mol %, a hydrogen concentration of about 20 mol % to about 80 mol %, a nitrogen concentration of about 1 mol % to about 40 mol %, a methane concentration of about 1 mol % to about 35 mol %, and an argon concentration of about 1 mol % to about 35 mol %. In another example, the second recycle gas via line 136 can have an ammonia concentration of about 0.5 mol % to about 5 mol %, a hydrogen concentration of about 45 mol % to about 55 mol %, a nitrogen concentration of about 15 mol % to about 20 mol %, and a combined amount of methane and argon of about 20 mol % to about 30 mol %.

The second recycle gas via line 136 can be at a temperature of about −40° C., about −20° C., about 0° C., about 15° C., or about 20° C. to about 25° C., about 30° C., about 35° C., about 40° C., or about 50° C. and a pressure of about 2,000 kPa, about 5,000 kPa, about 8,000 kPa, or about 10,000 kPa to about 12,000 kPa, about 15,000 kPa, about 20,000 kPa, about 25,000 kPa, or about 30,000 kPa.

The second recycle gas in line 136 can be split or apportioned such that a first portion can be recycled as the second recycle gas via line 138 to the second ammonia converter 126 and a second portion or second purge gas via line 140 can be purged from the system 100 and/or introduced to the ammonia recovery unit 141. The second recycle gas via line 138 and the second purge gas via line 140 can have the same composition or substantially the same compositions. As discussed and described above, the second recycle gas via line 138 can be mixed or otherwise combined with the first purge gas via line 124 and/or introduced separately to the second ammonia converter 126.

If the first purge gas in line 124 and the second purge gas in line 128 are combined with one another to produce a mixed gas or mixed feed via line 142, the mixed gas in line 142 can a hydrogen concentration from a low of about 20 mol %, about 25 mol %, about 35 mol %, or about 45 mol % to a high of about 55 mol %, about 70 mol %, about 75 mol %, or about 80 mol %. The mixed gas in line 142 can have a nitrogen concentration from a low of about 1 mol %, about 5 mol %, about 10 mol %, or about 15 mol % to a high of about 20 mol %, about 25 mol %, about 30 mol %, or about 40 mol %. The mixed gas in line 142 can have a methane concentration from a low of about 1 mol %, about 4 mol %, about 8 mol %, or about 10 mol % to a high of about 12 mol %, about 15 mol %, about 20 mol %, about 25 mol %, or about 35 mol %. The mixed gas in line 142 can have an argon concentration from a low of about 1 mol %, about 4 mol %, about 8 mol %, or about 10 mol % to a high of about 12 mol %, about 15 mol %, about 20 mol %, about 25 mol %, or about 35 mol %. The mixed gas in line 142 can have an ammonia concentration from a low of about 0.001 mol %, about 0.05 mol %, about 0.01 mol %, or about 0.1 mol % to a high of about 0.5 mol %, about 1 mol %, about 2 mol %, or about 15 mol %. For example, the mixed gas in line 142 can have a hydrogen concentration of about 20 mol % to about 80 mol %, a nitrogen concentration of about 5 mol % to about 40 mol %, a methane concentration of about 1 mol % to about 35 mol %, an argon concentration of about 1 mol % to about 35 mol %, and an ammonia concentration of about 0.001 mol % to about 15 mol %. In another example, the mixed gas in line 142 can have a hydrogen concentration of about 50 mol % to about 70 mol %, a nitrogen concentration of about 15 mol % to about 22 mol %, an ammonia concentration of about 1 mol % to about 5 mol %, a methane concentration of about 5 mol % to about 25 mol %, and an argon concentration of about 5 mol % to about 25 mol %. The mixed gas via line 142 can be introduced to the second ammonia converter 126 after heating in heat exchanger 130.

The second ammonia product via line 146 can be withdrawn from the product separator 134 and can have an ammonia concentration of about 90 mol %, about 95 mol %, about 97 mol %, or about 99 mol % to about 99.9 mol %, about 99.99 mol % or more. For example, the second ammonia product via line 146 can have an ammonia concentration of at least 90 mol %, at least 93 mol %, at least 95 mol %, or at least 97 mo % to a high of about 98 mol %, about 99 mol %, or about 99.99 mol % or more. The second ammonia product via line 146 can have a hydrogen concentration of about 0.001 mol %, about 0.05 mol %, about 0.01 mol %, or about 0.1 mol % to about 0.5 mol %, about 1 mol %, about 2 mol %, or about 5 mol %. The second ammonia product via line 146 can have a nitrogen concentration of about 0.001 mol %, about 0.005 mol %, about 0.01 mol %, or about 0.05 mol % to about 0.1 mol %, about 0.5 mol %, about 1 mol %, or about 2 mol %. The second ammonia product via line 146 can have a methane concentration of about 0 mol %, about 0.0001 mol %, or about 0.001 mol % to about 0.01 mol %, or about 0.1 mol %. The second ammonia product via line 146 can have an argon concentration of about 0 mol %, about 0.0001 mol %, or about 0.001 mol % to about 0.01 mol %, or about 0.1 mol %. The second ammonia product via line 146 can have an ammonia concentration of about 96 mol % to about 99.99 mol %, a hydrogen concentration of about 0.001 mol % to about 5 mol %, and a nitrogen concentration of about 0.01 mol % to about 5 mol %. The second ammonia product via line 146 can have an ammonia concentration of about 90 mol % to about 99.99 mol %, a hydrogen concentration of about 0.001 mol % to about 5 mol %, a nitrogen concentration of about 0.001 mol % to about 2 mol %, a methane concentration of about 0.0001 mol % to about 0.1 mol %, and an argon concentration of about 0.0001 mol % to about 0.1 mol %.

The second purge gas via line 140 can be sent to an ammonia recovery unit, 135 where a third ammonia product can be recovered from the second purge gas. The third ammonia produce via line 145 can have the same or substantially the same composition as the second ammonia product. The third ammonia product via line 149, the second ammonia product via line 146 can be mixed or otherwise combined with the first ammonia product via line 122 to produce a mixed ammonia product via line 148. A weight ratio of first ammonia product to the second ammonia product in the mixed ammonia product via line 148 can be about 3 to about 5. The overall or total ammonia yield in the mixed ammonia product via line 148 can be from a low of about 95%, about 96%, or about 97% to a high of about 98%, about 99%, about 99.5%, or about 99.9% of the syngas in line 112.

The mixed ammonia product via line 148 can have an ammonia concentration of about 90 mol %, about 95 mol %, about 97 mol %, or about 99 mol % to about 99.9 mol %, about 99.99 mol % or more. For example, the mixed ammonia product via line 148 can have an ammonia concentration of at least 90 mol %, at least 96 mol %, or at least 98 mol % to about 99 mol %, about 99.99 mol %, or 100 mol %. The mixed ammonia product via line 148 can have a hydrogen concentration from a low of about 0.001 mol %, about 0.05 mol %, about 0.01 mol %, or about 0.1 mol % to about 0.5 mol %, about 1 mol %, about 2 mol %, or about 5 mol %. The mixed ammonia product via line 148 can have a nitrogen concentration from a low of about 0.001 mol %, about 0.005 mol %, about 0.01 mol %, or about 0.05 mol % to about 0.1 mol %, about 0.5 mol %, about 1 mol %, or about 2 mol %. The mixed ammonia product via line 148 can have a methane concentration from a low of about 0 mol %, about 0.0001 mol %, or about 0.001 mol % to about 0.01 mol %, or about 0.1 mol %. The mixed ammonia product via line 148 can have an argon concentration from a low of about 0 mol %, about 0.0001 mol %, or about 0.001 mol % to about 0.01 mol %, or about 0.1 mol %. For example, the mixed ammonia product via line 148 can have an ammonia concentration of about 90 mol % to about 99.99 mol %, a hydrogen concentration of about 0.001 mol % to about 5 mol %, a nitrogen concentration of about 0.001 mol % to about 2 mol %, a methane concentration of about 0.0001 mol % to about 0.1 mol %, and an argon concentration of about 0.0001 mol % to about 0.1 mol %. In another example, the mixed ammonia product via line 148 can have an ammonia concentration of at least 90 mol %, at least 95 mol %, at least 97 mol %, or at least 99 mol % to about 99.9 mol % or about 99.99 mol %, a hydrogen concentration of about 0.001 mol % to about 5 mol %, a nitrogen concentration of about 0.001 mol % to about 2 mol %, a methane concentration of about 0.0001 mol % to about 0.1 mol %, and an argon concentration of about 0.0001 mol % to about 0.1 mol %.

It has been discovered that the system 100 can increase ammonia production from a smaller increase in syngas as compared to a conventional ammonia production system that includes only the first ammonia converter, i.e., the conventional ammonia production system does not include the second ammonia converter. In one example, the system 100 can increase ammonia production by about 38% with an increase of syngas of only 34%. In another example, the system 100 can increase ammonia production by about 10%, about 20%, about 30%, about 40%, about 50%, or about 60% with an increase of syngas of only about 5%, about 15%, about 25%, about 35%, about 45%, or about 55%, respectively. The ammonia production can be increased by the system 100 as compared to the conventional ammonia production system. For example, the ammonia production can be increased by about 30%, about 35%, about 40%, or about 45% to about 50%, about 55%, about 60%, or about 65%, while requiring about 0.5%, about 0.7%, about 1%, or about 1.5% to about 2%, about 2.5%, or about 3% less energy per tonne of ammonia produced, as compared to the conventional ammonia production system. In another example, the system 100 can increase ammonia production by about 0.2%, about 0.5%, about 0.7%, about 1%, about 1.5%, or about 1.7% to about 2%, about 2.5%, about 3%, about 3.5%, about 4%, or about 5%, for a given amount of syngas introduced to the system, as compared to the conventional ammonia production system.

The one or more hydrocarbon lines 102, one or more oxidant lines 104, and one or more steam lines 108 can be coupled to or in fluid communication with the syngas preparation unit 106. The syngas preparation unit 106 can include one or more shift converters (not shown), one or more purification systems (not shown), or a combination thereof to remove carbon dioxide ($CO_2$) from syngas produced in the syngas preparation unit 106. One or more carbon dioxide product lines 110 can also be coupled to or in fluid communication with the syngas preparation unit 106. One or more syngas lines 112 can be coupled to or in fluid communication with the syngas preparation unit 106 and to the compressor 114. One or more compressed syngas lines 116 can be coupled to or in fluid communication with the compressor 114 and the first ammonia converter 118. One or more first recycle gas lines 120, one or more first purge gas lines 124, and one or more first ammonia product lines 122 can be coupled to or in fluid communication with the first ammonia converter 118. The first purge gas line 124 can be coupled to or in fluid communication with the second ammonia converter 126.

The second ammonia converter 126 can be coupled to or in fluid communication with one or more second ammonia product lines 128. The second ammonia product line 128 can be coupled to or in fluid communication with the one or more heat exchangers 130. The heat exchanger 130 can produce the cooled second ammonia product via one or more lines 132 coupled to or in fluid communication with the product separator 134 and the heat exchanger 130. The cooled second ammonia product via line 132 can be separated in the product separator 134 to produce the second ammonia product via line 146 and the gas via line 136. Line 138 and line 140 can each be coupled to or in fluid communication with the first purge gas line 124. For example, the second recycle gas via line 138 can be mixed or otherwise combined with the first purge gas via line 124 to produce the mixed purge gas via line 142. Line 144 can be coupled to or in fluid communication with the second ammonia converter 126. For example, the heated mixed purge gas via line 144 can be introduced to the second ammonia converter 126. Line 146 can be coupled to or in fluid communication with the first ammonia product line 122. For example, second ammonia product via line 146 can be mixed or otherwise combined with the first ammonia product via line 122 to produce the mixed ammonia product via line 148.

The heat exchanger 130 can be or include one or more shell-and-tube, plate and frame, spiral wound, U-tube, bayonet style heat exchangers, or any combination thereof. The first heat exchanger 130 can cool the second ammonia product via line 128 recovered from the second ammonia converter 126 to produce the cooled second ammonia product via line 132. Heat can be indirectly transferred from the second ammonia product via line 128 mixed purge gas via line 142 in the heat exchanger 130 to produce the cooled second ammonia product via line 132 and the heated mixed purge gas via line 144 from the heat exchanger 130.

In one or more embodiments, heat can be indirectly transferred from the second ammonia product via line 128 to one or more heat transfer mediums in the heat exchanger 130 to produce the cooled second ammonia product via line 132 and heated heat transfer mediums from the heat exchanger 130. Illustrative heat transfer mediums can include, but are not limited to, cooling water, boiler feed water, low pressure steam, medium pressure steam, glycols, air and/or other gaseous fluids, or any combination thereof. The second ammonia product via line 128 can be cooled by direct contact or mixing (not shown) with a cooling fluid such as water to produce the cooled second ammonia product via line 132. The second ammonia product via line 128 can be cooled by a combination of indirect heat exchange and direct contact cooling.

The product separator 134 can include any system, device, or combination of systems and/or devices capable of separating the cooled second ammonia product via line 132. The product separator 134 can be operated at a temperature from a low of about −30° C., about −20° C., about −10° C., or about 0° C. to a high of about 10° C., about 20° C., about 30° C., or about 40° C. The product separator 134 can be operated at a temperature and pressure appropriate to separate product ammonia and separate dissolves gases, which can include, but are not limited to, hydrogen, nitrogen, argon, methane, or any mixture thereof. For example, the product separator 134 can be operated at a pressure of about 2,000 kPa to about 30,000 kPa.

Figure 2:
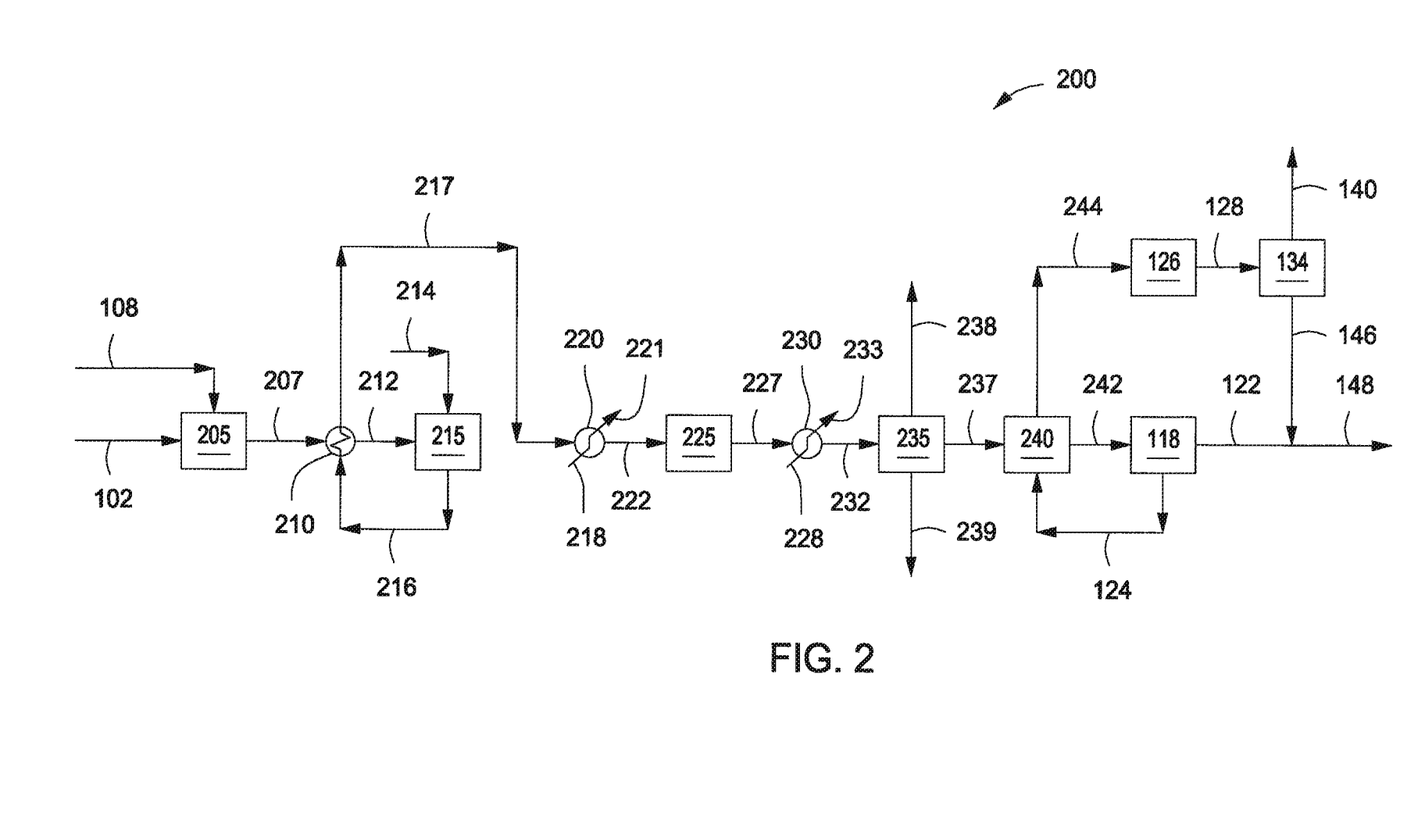
FIG. 2 depicts a schematic of another illustrative system for producing ammonia, according to one or more embodiments described.

FIG. 2 depicts another illustrative system 200 for producing ammonia according to one or more embodiments. The system 200 can include one or more primary reformers 205, one or more secondary reformers 215, one or more shift converter systems 225, one or more purification systems (two are shown 235, 240), and one or more heat exchangers (three are shown 210, 220, 230). The system 200 can also include the one or more first ammonia converters 118, the one or more second ammonia converters 126, the one or more product separators 134, or any combination thereof. In one or more embodiments, the first ammonia converter 118, and the second ammonia converter 126, and the product separator 134, can be as discussed and described above in reference to FIG. 1.

One or more hydrocarbons via line 102 and/or steam via line 108 can be introduced to the primary reformer 205 to produce an effluent via line 207. The hydrocarbon via line 102 and the steam via line 108 can be as discussed and described above in reference to FIG. 1. The steam introduced via line 108 can be introduced to the hydrocarbon via line 102 and/or directly to the primary reformer 205. In one or more embodiments, the molar ratio of steam-to-carbon in lines 108 and 102, respectively, can be about 2.5:1 to about 4:1, about 2.5:1 to about 3.5:1, or about 3:1 to about 4:1. In one or more embodiments, the pressure of the steam in line 108 can be about 700 kPa, about 1,000 kPa, or about 1,400 kPa to about 4,000 kPa, about 4,750 kPa, or about 5,500 kPa.

The effluent via line 207 can include, but is not limited to, hydrogen, carbon dioxide, carbon monoxide, nitrogen, argon, water, and methane. The hydrogen concentration in the effluent in line 207 can be from a low of about 31 mol %, about 33 mol %, or about 35 mol % to a high of about 39 mol %, about 41 mol %, or about 43 mol %. The carbon monoxide concentration in the effluent in line 207 can be from a low of about 3 mol %, about 3.5 mol %, or about 4 mol % to a high of about 5 mol %, about 5.5 mol %, or about 6 mol %. The carbon dioxide concentration in the effluent in line 207 can be from a low of about 4 mol %, about 4.5 mol %, or about 5 mol % to a high of about 6 mol %, about 6.5 mol %, or about 7 mol %. The water concentration in the effluent in line 207 can be from a low of about 38 mol %, about 40 mol %, or about 42 mol % to a high of about 47 mol %, about 49 mol %, or about 51 mol %. The methane concentration in the effluent in line 207 can be from a low of about 6 mol %, about 7 mol %, or about 8 mol % to a high of about 10 mol %, about 11 mol %, or about 12 mol %. For example, the effluent via line 207 can include about 35 mol % to about 39 mol % hydrogen, about 4 mol % to about 5 mol % carbon monoxide, about 6 mol % to about 8 mol % carbon dioxide, about 8 mol % to about 10 mol % methane, and about 42 mol % to about 47 mol % water and/or steam.

The effluent in line 207 can be at a temperature greater than the hydrocarbon in line 102. The effluent in line 207 can be at a temperature of about 650° C., about 675° C., or about 700° C. to about 730° C., about 740° C., or about 750° C. For example, the effluent in line 207 can be at a temperature of about 715° C., about 725° C., or about 735° C. The effluent in line 207 can be at a temperature of at least 700° C., at least 710° C., at least 715° C., or at least 720° C. In one or more embodiments, the temperature of the hydrocarbon via line 102 can be reformed to provide the effluent via line 207 having a monotonically increased temperature. As used herein, the term, "monotonically" means a change in temperature, which either consistently increases or consistently decreases, but does not oscillate in relative value. For example, the hydrocarbon via line 102 introduced to the primary reformer 205 at a temperature of 500° C. can be monotonically increased to a temperature of about 650° C. or more, which can be recovered from the primary reformer via line 207.

The effluent via line 207 can be heated in the heat exchanger 210 to produce a heated effluent via line 212. The temperature of the effluent via line 207 can be increased via indirect heat exchange in the heat exchanger 210 by about 150° C. or more, about 165° C. or more, about 185° C. or more, about 200° C. or more, or about 215° C. or more. The heated effluent via line 212 can be at a temperature of about 850° C., about 860° C., or about 870° C. to about 910° C., about 920° C., or about 930° C. For example, the heated effluent via line 212 can be at a temperature of about 875° C., about 885° C., or about 895° C.

The effluent via line 207 and/or the heated effluent via line 212 can be introduced to the secondary reformer 215 to provide a raw syngas via line 216. An oxidant via line 214 can also be introduced to the secondary reformer 215. The oxidant via line 214 can be compressed using one or more compressors to provide a compressed oxidant via line 214. The oxidant via line 214 can be air, containing about 21 mol % oxygen, about 78 mol % nitrogen, and about 1 mol % argon. The pressure of the compressed oxidant via line 214 can be about 700 kPa, about 1,000 kPa, or about 1,400 kPa to about 4,000 kPa, about 4,750 kPa, or about 5,500 kPa. Although not shown, the oxidant via line 214 can be preheated to a temperature of about 500° C. or more, about 550° C. or more, about 600° C. or more, about 700° C. or more, or about 800° C. or more.

The raw syngas via line 216 can include, but is not limited to, hydrogen, carbon dioxide, carbon monoxide, nitrogen, argon, water, methane, or any mixture thereof. The raw syngas via line 216 can include less than about 5 mol % methane, less than about 3 mol % methane, less than about 1 mol % methane, less than about 0.7 mol % methane, less than about 0.5 mol % methane, less than about 0.4 mol % methane, or less than about 0.3 mol % methane.

The primary reformer 205, the secondary reformer 215, or both can include one or more catalysts. For example, the primary reformer 205 can include one or more first catalysts and/or the secondary reformer 215 can include one or more second catalysts. The one or more catalysts can include, but are not limited to noble metals, cobalt, nickel, oxides thereof, derivatives therefore, or combinations thereof. The one or more catalysts can be supported by one or more support materials. The one or more support materials can include, but are not limited to alumina, refractory alumina, magnesium aluminate, calcium aluminate, calcium aluminate titanate, zirconia, cerium modified zirconia, or any combination thereof. An illustrative catalyst including nickel can have a nickel content of about 5 wt %, about 10 wt %, or about 12 wt % to about 15 wt %, about 20 wt %, or about 25 wt %. The one or more catalysts disposed in the primary reformer 205 can be the same as the one or more catalysts disposed in the secondary reformer 215. The one or more catalysts disposed in the primary reformer 205 can be different from the one or more catalysts disposed in the secondary reformer 215. For example, a nickel containing catalyst disposed in the primary reformer 205 can include about 15 wt % nickel to about 20 wt % nickel and a nickel containing catalyst disposed in the secondary reformer 215 can include about 10 wt % to about 15 wt % nickel.

The catalysts can be prepared in any desired shape or form by a variety of methods, for example, briquetting, tabletting, etc. The shape of the catalyst can be in the form of extruded, briquetted or tabletted cylinders, polylobal extrusions, spheres, rings, hollow core cylinders, solid cylinders, hollow core cylinders with grooves on the inside and/or outside surfaces, or any other appropriate geometric shape.

The primary reformer 205 can be any suitable type of reformer, which can include one or more first reaction zones. For example, the primary reformer 205 can be a plurality of radiantly heated, single walled, catalyst-containing tubes. The primary reformer 205 can include 200 or more tubes, 400 or more tubes, 500 or more tubes, 600 or more tubes, 700 or more tubes, 800 or more tubes, 900 or more tubes, or 1,000 or more tubes. The tubes can have an inside diameter of about 40 mm, about 50 mm, or about 65 mm to about 90 mm, about 100 mm, or about 115 mm or more. For example, the inner diameter of one or more tubes can be about 70 mm, about 75 mm, or about 80 mm.

The hydrocarbon introduced via line 102 to the primary reformer 205 can flow through the plurality of tubes and can be recovered via a manifold collection system (not shown), which can be in fluid communication with line 207. For example, the plurality of tubes can be mounted horizontally, vertically, or at any angle therebetween and the hydrocarbon introduced via line 102 can flow from a first end of the tubes in fluid communication with line 102 to a second end of the plurality of tubes, which can be in fluid communication with line 207.

The secondary reformer 215 can be any suitable type of reformer, which can include one or more second reaction zones. For example, the secondary reformer 215 can be an internally insulated reformer, which can also be cooled on the outside via one or more cooling systems, e.g., a water jacket. The secondary reformer 215 can include one or more catalysts in any arrangement, configuration and/or orientation. The one or more catalyst beds can include fixed beds, fluidized beds, ebullating beds, slurry beds, moving beds, bubbling beds, any other suitable type of catalyst bed, or combinations thereof. The secondary reformer 215 can include, for example, a fixed single bed nickel catalyst set in two layers.

The raw syngas via line 216 can be introduced to the heat exchanger 210, where heat can be directly or indirectly transferred from the raw syngas via line 216 to the effluent via line 207 in the heat exchanger 210 to provide a cooled raw syngas via line 217 and the heated effluent via line 212, respectively. The heated effluent via line 212 can have a temperature greater than the effluent via line 207. The cooled raw syngas via line 217 can have a temperature less than the raw syngas via line 216. The raw syngas via line 216 can be at a temperature of about 960° C., about 970° C., 980° C., 990° C., or about 1,000° C. to about 1,010° C., about 1,020° C., or about 1,030° C. or more. The temperature of the raw syngas via line 216 can be about 995° C., about 1,000° C., or about 1,005° C. The temperature of the raw syngas via line 216 can be decreased via the indirect heat exchange in the heat exchanger 210 by about 80° C. or more, about 100° C. or more, about 120° C. or more, about 130° C. or more, or about 140° C. or more. The cooled raw syngas via line 217 can be at a temperature of about 860° C., about 870° C., or about 880° C. to about 900° C., about 910° C., or about 920° C. Although not shown, the heat exchanger 210 can be or include one or more reforming exchangers. The reforming exchanger can include one or more catalysts that can convert at least a portion of any remaining hydrocarbons, e.g., methane, to additional syngas. Illustrative reforming exchangers can be or include those discussed and described in U.S. Pat. Nos. 7,932,296 and 8,273,139.

The cooled raw syngas via line 217 can be introduced to the heat exchanger 220 to provide a further cooled raw syngas via line 222. Heat can be indirectly transferred from the cooled raw syngas via line 217 to a heat transfer medium via line 218 to produce the further cooled raw syngas via line 222 and a steam via line 221, respectively. Suitable heat transfer mediums introduced via line 218 can include, but are not limited to water, waste water, another process feed from within the plant, mixtures thereof, or combinations thereof. For example, the heat transfer medium via line 218 can be boiler feed water.

The steam via line 221 can be low pressure steam, medium pressure steam, or high pressure steam. The steam via line 221 can have a temperature of about 200° C. or more, 300° C. or more, 400° C. or more, 450° C. or more, 475° C. or more, or 500° C. or more and a pressure of about 200 kPa, about 400 kPa, or about 600 kPa to about 4,200 kPa, about 6,200 kPa, about 8,500 kPa, or about 12,500 kPa or more.

The heat exchanger 220 can be or include any system, device, or combination of systems and/or devices suitable for indirectly transferring heat from one fluid to another fluid. For example, the heat exchanger 220 can be or include one or more shell-and-tube, plate and frame, spiral wound, U-tube, and/or bayonet style heat exchangers. The heat exchanger 220 can include surface enhanced tubes (e.g., fins, static mixers, rifling, heat conductive packing, turbulence causing projections, or any combination thereof), and the like.

The cooled raw syngas via line 222 can be introduced to the shift converter system 225 to provide a shifted syngas via line 227. The shift converter system 225 can adjust the hydrogen to carbon monoxide ratio ("$H_2$:CO") of the syngas by converting carbon monoxide to carbon dioxide. In the shift converter system 225, a water-gas shift reaction can react at least a portion of the carbon monoxide in the cooled raw syngas introduced via line 222 with water in the presence of a catalyst and/or high temperature to produce hydrogen and carbon dioxide. The shift converter system 225 can include, but are not limited to, single stage adiabatic fixed bed reactors, multiple-stage adiabatic fixed bed reactors with interstage cooling, steam generation or cold quench reactors, tubular fixed bed reactors with steam generation or cooling, fluidized bed reactors, or any combination thereof. For example, a sorption enhanced water-gas shift ("SEWGS") process, utilizing a pressure swing adsorption unit having multiple fixed bed reactors packed with shift catalyst and high temperature (around 475° C.) carbon dioxide adsorbent, can be used.

The shift converter system 225 can include two or more reactors arranged in series and/or parallel. The shift converter system 225 can include one or more high temperature shift converters ("HTSC"), one or more medium temperature shift converters ("MTSC"), one or more low temperature shift converters ("LTSC"), or any combination thereof. At least a portion of the syngas via line 222 can be introduced to one or more HTSCs, MTSCs, and/or LTSCs in any order and/or combination thereof.

The shifted syngas via line 227 can include less carbon monoxide than the cooled raw syngas introduced via line 222. The shifted syngas via line 227 can include about 5 mol % or less dry basis carbon monoxide, about 3 mol % or less dry basis carbon monoxide, about 2 mol % dry basis or less carbon monoxide, about 1 mol % or less dry basis carbon monoxide, or about 0.5 mol % dry basis or less dry basis carbon monoxide.

The syngas via line 222 can be apportioned equally or unequally to any one or more of the HTSCs, MTSCs, LTSCs. For example, about 75 vol % of the cooled raw syngas via line 222 can be introduced to HTSCs and about 25 vol % can be introduced to a MTSC. The converted syngas from the HTSC and the MTSC can then be introduced to the heat exchanger 230 and/or first purification system 235.

The HTSCs, MTSCs, and/or LTSCs can include one or more catalysts. The HTSCs, MTSCs, and LTSCs can convert carbon monoxide in the cooled raw syngas via line 222 to carbon dioxide by reacting the carbon monoxide in the presence of one or more catalysts in the one or more HTSCs, MTSCs, and/or LTSCs, at a temperature sufficient to oxidize the carbon monoxide. The catalyst in the one or more HTSCs can include, but is not limited to iron oxide, zinc ferrite, magnetite, chromium oxides, derivatives thereof, or any combination thereof. The one or more HTSCs can be operated at a temperature of about 325° C. to about 550° C. The catalyst disposed in the one or more MTSCs can include, but is not limited to, iron oxide, chromium oxide, derivatives thereof, or any combination thereof. The one or more MTSCs can be operated at a temperature of about 250° C. to about 300° C. The catalyst disposed in the one or more LTSCs can include, but is not limited to, copper, zinc, copper promoted chromia, derivatives thereof, or any combination thereof. The one or more LTSC can be operated at a temperature about 180° C. to about 220° C.

The shifted syngas via line 227 can be introduced to the heat exchanger 230 to provide a cooled shifted syngas via line 232 and steam via line 233, respectively. Heat can be indirectly transferred from the shifted syngas via line 227 to a heat transfer medium via line 228 in the heat exchanger 230. The heat transfer medium via line 228 can be, but is not limited to water, waste water, another process feed from in the plant, mixtures thereof, or combinations thereof. The steam via line 233 can be low pressure steam, medium pressure steam, or high pressure steam. Although not shown, the shifted syngas via line 227 can be cooled by introducing the one or more heat transfer mediums via line 228 to the shifted syngas via line 227.

The heat exchanger 230 can be or include any system, device, or combination of systems and/or devices suitable for indirectly transferring heat from one fluid to another fluid. For example, the heat exchanger 230 can be or include one or more shell-and-tube, plate and frame, spiral wound, U-tube, and/or bayonet style heat exchangers. The heat exchanger 230 can include surface enhanced tubes (e.g., fins, static mixers, rifling, heat conductive packing, turbulence causing projections, or any combination thereof), and the like.

The cooled shifted syngas via line 232 can be introduced to the first purification system 235 to produce the first purified syngas via line 237. The first purification system 235 can include, but is not limited to one or more carbon dioxide removal systems, methanators, driers, or any combination thereof. The cooled shifted syngas via line 232 can be introduced to one or more carbon dioxide removal systems to remove at least a portion of the carbon dioxide via line 238.

The carbon dioxide removal system in the first purification system 235 can selectively separate carbon dioxide from the converted syngas to provide a carbon dioxide-lean syngas, or lean syngas, and a carbon dioxide gas via line 238. For example, the carbon dioxide-lean syngas can include 1 mol % dry basis or less carbon dioxide and 1 mol % dry basis or less carbon monoxide. The separated carbon dioxide can be recovered via line 238. The carbon dioxide-lean syngas can be introduced to the one or more methanators and/or the one or more driers in the first purification system 235.

The carbon dioxide-lean syngas can be introduced to the one or more methanators in the first purification system 235 to convert at least a portion of any carbon monoxide and/or carbon dioxide to methane and water. For example, the total carbon monoxide and carbon dioxide in the syngas can be less than about 1000 ppmw, less than about 750 ppmw, or less than about 500 ppmw of total carbon monoxide and carbon dioxide. The syngas lean in carbon monoxide and carbon dioxide can be introduced to the one or more driers in the first purification system 235 to provide water via line 239 and a dried syngas. The one or more driers can remove or separate at least a portion of any water in the carbon monoxide and carbon dioxide-lean syngas to provide the dried syngas.

The first purification system 235 can provide a first purified syngas via line 237 which can have a hydrogen concentration from a low of about 40 mol %, about 50 mol %, or about 55 mol % to a high of about 75 mol %, about 80 mol %, or about 85 mol %. The first purified syngas via line 237 can have a nitrogen concentration from a low of about 10 mol %, about 20 mol %, or about 25 mol % to a high of about 40 mol %, about 45 mol %, or about 50 mol %. The first purified syngas via line 237 can have a methane concentration of less than about 4 mol %, less than about 3 mol %, less than about 2 mol %, less than about 1 mol %, or less than about 0.9 mol %. The first purified syngas via line 237 can have an oxygen concentration of about 0.1 mol % to about 5 mol %, about 0.5 mol % to about 4 mol %, or about 0.8 mol % to about 3 mol %. The first purified syngas via line 237 can have an argon concentration of about 0.05 mol % to about 2 mol %, about 0.1 mol % to about 1.5 mol %, or about 0.1 mol % to about 1 mol %.

The first purified syngas via line 237 can have a $H_2:N_2$ molar ratio of about 1.5:1 to about 5:1, about 2:1 to about 4:1, or about 2.2:1 to about 3.2:1. The first purified syngas via line 237 can have a $H_2:N_2$ molar ratio of about 1.6:1, about 1.8:1, about 1.9:1, about 2.1:1, about 2.2:1, about 2.3:1, or about 2.4:1. The pressure of the first purified syngas via line 237 can be about 1,000 kPa to about 20,800 kPa, about 2,000 kPa to about 13,700 kPa, about 3,000 kPa to about 10,400 kPa, or 1,000 kPa to about 4,000 kPa. The temperature of the first purified syngas via line 237 can be about −100° C. to about 100° C., about −50° C. to about 50° C., or about −25° C. to about 25° C.

The one or more carbon dioxide removal systems can be or include any one or a combination of physical, mechanical, electrical and/or chemical systems configured in series, parallel, or any combination thereof. In one or more embodiments, the one or more carbon dioxide removal systems can include one or more physical separation systems including, but not limited to, membrane type systems and solvent based systems. For example, the one or more carbon dioxide removal systems can include, but are not limited to, absorption/desorption type, solvent-based systems. The carbon dioxide removal system can contact the syngas introduced via line 232 with one or more absorbents to remove at least a portion of the carbon dioxide. Carbon dioxide selective adsorbents can include, but are not limited to, monoethanolamine ("MEA"), diethanolamine ("DEA"), triethanolamie ("TEA"), potassium carbonate, methyldiethanolamine ("MDEA"), activated methyldiethanolamine ("aMDEA"), diglycolamine ("DGA"), diisopropanolamine ("DIPA"), derivatives thereof, mixtures thereof, or any combination thereof. Other suitable adsorbents and techniques can include, but are not limited to, propylene carbonate physical adsorbent solvent as well as other alkyl carbonates, dimethyl ethers of polyethylene glycol of two to twelve glycol units (Selexol™ process), n-methyl-pyrrolidone, sulfolane, and use of the Sulfinol® Gas Treatment Process.

The one or more methanators can be or include any one or a combination of physical, mechanical, electrical and/or chemical systems to convert carbon monoxide and carbon dioxide to methane, configured either in series, parallel, or any combination thereof. The one or more methanators can be a catalytic process operating at a temperature sufficient for converting or reacting at least a portion of any carbon monoxide and/or carbon dioxide to methane and water. The one or more catalytic process can include one or more catalytic reactors arranged in series or parallel, including one or more catalysts suitable for the conversion of carbon monoxide and carbon dioxide to methane. Suitable methanator catalysts can include, but are not limited to, nickel, a rare earth promoted nickel, derivatives thereof, or combinations thereof. The methanator can operate at a temperature of about 200° C. to about 400° C. The carbon monoxide and carbon dioxide-lean syngas can include about 50 ppm carbon monoxide and carbon dioxide or less, or about 30 ppm carbon monoxide and carbon dioxide or less, or about 10 ppm carbon monoxide and carbon dioxide or less.

The one or more driers can include, but are not limited to one or more molecular sieves, absorbents, adsorbents, flash tank separators, incinerators, or any combination thereof. Suitable absorbents can include, but are not limited to, glycol, alkali-earth halide salts, derivatives thereof, or mixtures thereof. Suitable adsorbents can include but are not limited to, activated alumina, silica gel, molecular sieves, activated carbon, derivatives thereof, or mixtures thereof.

The first purified syngas via line 237 can be introduced to the second purification system 240, where one or more contaminants such as excess nitrogen, argon, oxygen, and methane can be removed to provide a contaminant-lean gas mixture or second purified syngas via line 242. The second purification system 240 can be used to remove or separate any contaminants, including excess nitrogen, e.g., nitrogen in excess of that necessary to provide a $H_2:N_2$ molar ratio of about 2.2:1 to about 3.2:1, from the gas mixture. The second purification system 240 can include one or more cryogenic-type separators operating at a temperature less than −150° C. The one or more contaminants and/or excess nitrogen can be removed from the second purification system 240 as a first purge gas or waste gas via line 244.

The second purified syngas via line 242 can include nitrogen, hydrogen, and ammonia ($NH_3$). The composition of the second purified syngas via line 242 can be the same as or different from that of the compressed syngas via line 116 of FIG. 1. For example, the second purified syngas via line 242 can have a H$_2$:N$_2$ molar ratio of about 2:1 to about 4:1, or of about 2.2:1 to about 3.2:1. The H$_2$:N$_2$ molar ratio can also be about 2.9:1, about 3:1, about 3.1:1, or about 3.2:1. The second purified syngas via line 242 can have a hydrogen concentration from a low of about 50 mol %, about 60 mol %, about 65 mol %, or about 70 mol % to a high of about 75 mol %, about 80 mol %, about 85 mol %, or about 90 mol %. The second purified syngas via line 242 can have a nitrogen concentration from a low of about 10 mol %, about 15 mol %, about 20 mol %, or about 22 mol % to a high of about 25 mol %, about 30 mol %, about 35 mol %, or about 40 mol %. The second purified syngas via line 242 can have a methane concentration from a low of about 0.001 mol %, about 0.05 mol %, about 0.01 mol %, or about 0.1 mol % to a high of about 0.5 mol %, about 1 mol %, about 2 mol %, or about 5 mol %. The second purified syngas via line 242 can have a concentration of oxygen containing compounds from a low of about 0.001 mol %, about 0.005 mol %, about 0.01 mol %, or about 0.05 mol % to a high of about 0.1 mol %, about 0.5 mol %, about 1 mol %, or about 2 mol %. The second purified syngas via line 242 can have an argon concentration form a low of about 0.001 mol %, about 0.05 mol %, about 0.01 mol %, or about 0.1 mol % to a high of about 0.5 mol %, about 1 mol %, about 2 mol %, or about 5 mol %. The second purified syngas via line 242 can have an ammonia concentration from a low of about 0.001 mol %, about 0.05 mol %, about 0.01 mol %, or about 0.1 mol % to a high of about 0.5 mol %, about 1 mol %, about 2 mol %, or about 5 mol %.

The second purified syngas via line 242 can be introduced to the first ammonia converter 118 to produce the first ammonia product via line 122 and the first purge gas via line 124, any or all of which can be as discussed and described above in reference to FIG. 1. The first purge gas via line 124 can be recycled or otherwise introduced to the second purification system 240. The first purge gas via line 124 can be recycled to the first purified syngas in line 237 prior to introducing the first purified syngas 237 to the second purification system 240. The purge gas via line 124 can be introduced via line 244 to the second ammonia converter 126 to produce the effluent via line 128. The effluent via line 128 can be introduced to the product separator 134 to produce the second purge gas via line 140 and the second ammonia product via line 146. The second ammonia product via line 146 can be combined with the first ammonia product via line 122 to produce a mixed ammonia product via line 148. Although not shown, the second purge gas can be split into a first portion and a second portion as discussed and describe above with reference to FIG. 1. More particularly, the first portion can be recycled to the second ammonia converter 126 and/or combined with the first purge gas in line 244 and introduced to the second ammonia converter. The second portion can be introduced to an ammonia recovery unit to produce a third ammonia product and a third purge gas. The first purge gas in line 244 and/or the first purge gas mixed with the second purge gas 140 can be heated by indirectly exchange heat from the effluent 128. The compositions of the second ammonia product in line 128, the second purge gas in line 140, the second ammonia product in line 146, and/or the mixed ammonia product in line 148 can be as discussed and described above with reference to FIG. 1. Additionally, the compositions of the third purge gas and/or the third ammonia product can be as discussed and described above with reference to FIG. 1.

The composition of the purge gas via line 244 can be the same as or different from that of the first purge gas via line 124 of FIG. 1. The purge gas via line 244 can have a hydrogen concentration of from a low of about 50 mol %, about 60 mol %, about 65 mol %, or about 70 mol % to a high of about 75 mol %, about 80 mol %, about 85 mol %, or about 90 mol %. The purge gas via line 244 have a nitrogen concentration from a low of about 10 mol %, about 15 mol %, about 20 mol %, or about 22 mol % to a high of about 25 mol %, about 30 mol %, about 35 mol %, or about 40 mol %. The purge gas via line 244 can have a methane concentration from a low of about 0.002 mol %, about 0.08 mol %, about 0.1 mol %, or about 0.2 mol % to a high of about 0.5 mol %, about 1 mol %, about 2 mol %, or about 5 mol %. The purge gas via line 244 can have an argon concentration from a low of about 0.001 mol %, about 0.05 mol %, about 0.01 mol %, or about 0.1 mol % to a high about 0.5 mol %, about 1 mol %, about 2 mol %, or about 5 mol %. The purge gas via line 244 can have an ammonia concentration from a low of about 0.001 mol %, about 0.05 mol %, about 0.01 mol %, or about 0.1 mol % to a high of about 0.5 mol %, about 1 mol %, about 2 mol %, or about 5 mol %. In one example, the one or more contaminants and/or excess nitrogen that can be removed from the second purification system 240 can be removed as a separate purge gas. As such, the one or more contaminants and/or excess nitrogen removed that can be removed from the second purification system can bypass or otherwise avoid introduction to the second ammonia converter 126 if desired.

Prophetic Examples

To provide a better understanding of the foregoing discussion, the following non-limiting prophetic examples are provided. All parts, proportions and percentages are by weight unless otherwise indicated.

A simulation is performed for a conventional ammonia synthesis configuration having a single ammonia converter. In this simulation, syngas is produced from a hydrocarbon feed, air (or oxygen enriched air), and steam. The hydrocarbon feed could be coal, oil, or gas and the syngas includes a stoichiometric mixture of hydrogen and nitrogen and about 1.1 vol % of inert gases, such as argon and methane. The syngas is at a pressure of about 2,600 kPa via line 112 and compressed to an ammonia synthesis pressure of about 13,100 kPa via line 116. The inert gas concentration is allowed to increase to 13.3 vol % in the recycle gas line via 120 by regulating the purge gas flow. With the inert concentration of about 15 vol % in the purge gas line via 124, the purge gas flow is 117 ton/day, representing 8.9% of the flow of syngas via line 112 at 1,313 ton/day. The amount of ammonia produced via line 122 is 1,196 ton/day and the recycle gas via line 120 is 7,001 ton/day. The second ammonia converter 126, the heat exchanger 130, the product separator 134, and the ammonia recovery unit 141 are not used in the simulated process of this conventional ammonia synthesis configuration. The simulated process results for the conventional process utilizing a single ammonia converter are shown in Table 1 below.

TABLE 1

Products and Operating Conditions for Single Ammonia Converter with Unconverted Purge

|  | 112 Syngas | 120 Recycle | 122 Ammonia Product | 124 Existing Purge |
|---|---|---|---|---|
| H$_2$, Mole % | 73.98 | 51.48 | 0 | 59.23 |
| N$_2$, Mole % | 24.94 | 20.68 | 0 | 23.79 |
| Ar + CH$_4$, Mole % | 1.08 | 13.29 | 0 | 15.26 |

TABLE 1-continued

Products and Operating Conditions for Single
Ammonia Converter with Unconverted Purge

| | 112 Syngas | 120 Recycle | 122 Ammonia Product | 124 Existing Purge |
|---|---|---|---|---|
| $NH_3$, Mole % | 0 | 14.55 | 100 | 1.72 |
| Pressure, kPa | 2,600 | 13,100 | 1,600 | 13,000 |
| Temperature, ° C. | 26 | 51 | −22 | 20 |
| Flow, ton/day | 1,313 | 7,001 | 1,196 | 117 |

A simulation is also performed for an ammonia synthesis process in which a second synthesis loop, with a second ammonia converter, is added to produce a second ammonia product from the first purge gas withdrawn from the existing ammonia synthesis unit. The operating conditions on the existing ammonia synthesis unit are improved by increasing the flow rate of the purge gas to utilize more of the capacity of the existing equipment. In this simulation, the purge gas flow is increased by a factor of 3.7 from that of the conventional configuration to 432 ton/day. This increase reduced the concentration of the inerts in the existing synthesis unit to 5.25 vol % at a concentration factor of 2.53. The ammonia production from the existing synthesis equipment, the first ammonia product via line 122, increased to 1,333 ton/day with the reduced inert concentration. The ammonia production from the new second ammonia converter, the second ammonia product in line 146, is 319 ton/day giving a total ammonia production, the mixed ammonia product, of 1,652 ton/day, which is an increase of 456 ton/day above the production from the existing synthesis unit. The purge gas flow from the second ammonia converter, the second purge in line 140, is 113 ton/day or 6.4% of the syngas flow in line 112 of 1,765 ton/day compared with the 8.9% on the existing synthesis unit. Thus, the conversion of the syngas to ammonia is higher when a second ammonia converter is added to convert a purge gas from a conventional ammonia synthesis unit.

The simulated process results from the process utilizing the second ammonia converter with the conventional single ammonia converter are shown in Table 2 below.

This simulated data shows that installing a second ammonia converter, as discussed and described above with reference to FIG. 1, to enhance an existing ammonia synthesis unit reduces the recycle flow rate of the existing ammonia synthesis unit and reduces the energy per ton of ammonia produced by about 2%. The simulated data also shows that installing a second ammonia converter, as discussed and described above with reference to FIG. 1, to enhance an existing ammonia synthesis unit increases the ammonia production, by 38.1% for an increase in syngas of only 34.4%. The ammonia synthesis process provides a significant improvement over the conventional ammonia synthesis process and provides a significant increase in ammonia production by revamping an existing conventional synthesis unit while also reducing the energy required to produce a given amount of ammonia.

It has been surprisingly and unexpectedly discovered that adding a second ammonia converter to an existing ammonia synthesis loop can produce additional ammonia from a purge gas exiting the ammonia synthesis loop while achieving greater ammonia production in the existing ammonia synthesis loop. The second ammonia converter can allow for a significant increase in the amount of purge gas removed from an existing ammonia converter that can reduce a concentration of inert gas (e.g., methane and argon) in the existing ammonia converter, which can increase ammonia production in the first ammonia converter. The inert gas concentration in the first ammonia synthesis loop can be significantly reduced by increasing the flow rate of purge gas therefrom. In particular, the second ammonia converter can allow for a greater percentage of the contents in the first ammonia converter to be withdrawn as a purge gas. This withdrawn purge gas can include increased amounts of inert compounds, but also increased amounts of hydrogen and nitrogen. The additional hydrogen and nitrogen in the purge gas can be converted to ammonia in the second ammonia converter.

The concentration of inert gases in the purge gas withdrawn from the second ammonia synthesis loop can be high, allowing for more efficient separation and removal of the

TABLE 2

Products and Operating Conditions for Purge introduced to Second Ammonia Converter

| Line | | $H_2$ (mol %) | $N_2$ (mol %) | Ar + $CH_4$ (mol %) | $NH_3$ (mol %) | Press. (kPa) | Temp. (° C.) | Flow (ton/day) |
|---|---|---|---|---|---|---|---|---|
| 112 | Syngas | 74.09 | 24.71 | 1.2 | 0 | 2,300 | 12 | 1,765 |
| 120 | First Recycle | 69.35 | 23.13 | 5.25 | 2.27 | 13,300 | 31 | 3,786 |
| 122 | First Ammonia Product | 0 | 0 | 0 | 100 | 13,300 | −23 | 1,333 |
| 124 | First Purge Gas | 69.35 | 23.13 | 5.25 | 2.27 | 12,600 | 31 | 432 |
| 128 | Effluent | 50.62 | 16.88 | 23.85 | 8.65 | 12,400 | 119 | 3,502 |
| 136 | Second Purge Gas | 54.26 | 18.09 | 25.55 | 2.1 | 12,300 | 22 | 113 |
| 138 | Second Recycle | 54.26 | 18.09 | 25.55 | 2.1 | 12,300 | 22 | 3,070 |
| 146 | Second Ammonia Product | 0 | 0 | 0 | 100 | 9,900 | −26 | 319 |
| 148 | Mixed Ammonia Product | 0 | 0 | 0 | 100 | 1,700 | −21 | 1,652 | inerts from the purge gas. Without the presence of the inerts in the stream recycled to the first and/or second synthesis converter, the ammonia production in the first synthesis loop can be increased at the same or lower ammonia synthesis pressure by the addition of more make up gas to the first ammonia synthesis loop. The ammonia production in both the first and second ammonia converters can be greater than the ammonia production in only the first ammonia converter in the existing ammonia synthesis loop. The resulting ammonia production can be increased by about 56%, while requiring about 2% less energy per tonne of ammonia produced, compared to conventional ammonia synthesis units.

Embodiments of the present disclosure further relate to any one or more of the following paragraphs:

1. A system for producing ammonia, comprising: a first ammonia converter adapted to react a syngas comprising hydrogen, nitrogen, and argon to produce a first ammonia product and a first purge gas, wherein the first purge gas comprises nitrogen, hydrogen, and argon; a second ammonia converter in fluid communication with the first ammonia converter, the second ammonia converter adapted to react the first purge gas to produce an effluent comprising ammonia and argon; a product separator in fluid communication with the second ammonia converter, the product separator adapted to separate the effluent to produce a second ammonia product comprising ammonia and a second purge gas comprising ammonia and argon; and an ammonia recovery unit in fluid communication with the product separator, the ammonia recovery unit adapted to separate at least a portion of the second purge gas to produce a third ammonia product comprising ammonia and a third purge gas comprising argon.

2. The system according to paragraph 1, further comprising a heat exchanger in fluid communication with the first ammonia converter and the second ammonia converter, the heat exchanger adapted to indirectly exchange heat from the effluent to at least a portion of the first purge gas.

3. The system according to paragraph 1 or 2, further comprising a compressor in fluid communication with the first ammonia converter, the compressor adapted to compress at least a portion of the syngas.

4. The system according to any one of paragraphs 1 to 3, further comprising a first recycle line in fluid communication with the first ammonia converter, the first recycle line adapted to recycle a recycle gas from the first ammonia converter to the syngas.

5. The system according to any one of paragraphs 1 to 4, further comprising a second recycle line in fluid communication with the product separator, the second recycle line configured to recycle at least a portion of the second purge gas to the first purge gas.

6. The system according to any one of paragraphs 1 to 5, further comprising one or more reformers configured to reform a hydrocarbon to produce a syngas comprising hydrogen and nitrogen.

7. The system according to paragraph 6, wherein the one or more reformers comprises a steam reformer, an autothermal reformer, a gasifier, a partial oxidation reactor, a catalytic partial oxidation reactor, or any combination thereof.

8. The system according to any one of paragraphs 1 to 7, wherein the first ammonia converter is a single-pass converter or a multi-pass converter.

9. The system according to any one of paragraphs 1 to 8, wherein the second ammonia converter is a single-pass converter or a multi-pass converter.

10. The system according to any one of paragraphs 1 to 8, wherein the first ammonia converter is single-pass converter, and wherein the second ammonia converter is a multi-pass converter.

11. The system according to any one of paragraphs 1 to 8, wherein the first ammonia converter is multi-pass converter, and wherein the second ammonia converter is a single-pass converter.

12. The system according to any one of paragraphs 1 to 8, wherein the first ammonia converter and the second ammonia converter are each a multi-pass converter.

13. The system according to any one of paragraphs 1 to 8, wherein the first ammonia converter and the second ammonia converter are each a single-pass converter.

14. A method for producing ammonia, comprising: reacting a syngas comprising hydrogen, nitrogen, and argon in a first ammonia converter to produce a first ammonia product and a first purge gas comprising nitrogen, hydrogen, and argon; reacting the first purge gas in a second ammonia converter to produce an effluent comprising ammonia and argon; separating the second ammonia product to produce a second ammonia product comprising ammonia and a second purge gas comprising ammonia and argon; and separating the second purge gas to produce a third ammonia product comprising ammonia and a third purge gas comprising argon.

15. The method according to paragraph 14, wherein the first ammonia converter produces the first ammonia product at a conversion rate of about 70% to about 90% of the syngas.

16. The method according to paragraph 14 or 15, wherein the syngas has molar ratio of hydrogen to nitrogen of about 2:1 to about 4:1.

17. The method according to any one of paragraphs 14 to 16, wherein the first ammonia product comprises about 90 mol % to about 99.99 mol % ammonia, wherein the second ammonia product comprises about 90 mol % to about 99.99 mol % ammonia, and wherein the third ammonia product comprises about 90 mol % to about 99.99 mol % ammonia.

18. The method according to any one of paragraphs 14 to 17, wherein the first purge gas comprises about 40 mol % to about 90 mol % hydrogen, about 10 mol % to about 40 mol % nitrogen, about 0.002 mol % to about 15 mol % methane, about 0.001 mol % to about 5 mol % argon, and about 0.001 mol % to about 15 mol % ammonia.

19. The method according to any one of paragraphs 14 to 18, wherein the second purge gas comprises about 20 mol % to about 80 mol % hydrogen, about 1 mol % to about 40 mol % nitrogen, about 1 mol % to about 35 mol % methane, about 1 mol % to about 35 mol % argon, and about 0.01 mol % to about 15 mol % ammonia.

20. The method according to any one of paragraphs 14 to 19, further comprising mixing the first ammonia product, the second ammonia product, and the third ammonia product to produce a mixed ammonia product.

21. The method according to any one of paragraphs 14 to 20, further comprising indirectly exchanging heat from the effluent to at least a portion of the first purge gas prior to separating the effluent to produce the second ammonia product and the second purge gas.

22. The method according to any one of paragraphs 14 to 21, further comprising separating the second purge gas into a first portion and a second portion, wherein the second portion is separated to produce the third ammonia product and the third purge gas, and wherein the first portion is recycled to the second ammonia converter by combining the second portion with the first purge gas to produce a mixed purge gas.

23. The method according to any one of paragraphs 14 to 22, further comprising exchanging heat from the effluent to at least a portion of the first purge gas prior to separating the effluent to produce the second ammonia product and the second purge gas, wherein: the syngas further comprises methane, the first purge gas further comprises methane and ammonia, the effluent further comprises nitrogen, hydrogen, and methane, the second ammonia product further comprises nitrogen, hydrogen, ammonia, and methane, the first ammonia converter produces the first ammonia product at a conversion rate of about 70% to about 90% of the syngas, the syngas has a molar ratio of hydrogen to nitrogen of about 2.8:1 to about 3.2:1, the first ammonia product, the second ammonia product, and the third ammonia product each comprise about 95 mol % to about 99.99 mol % ammonia.

24. The method according to any one of paragraphs 14 to 23, wherein reacting the syngas in the first ammonia converter further produces a first recycle, and wherein the first recycle has the same composition as the first purge gas.

25. The method according to any one of paragraphs 14 to 24, wherein the first purge gas has a hydrogen concentration of about 65 mol % to about 75 mol %, a nitrogen concentration of about 18 mol % to about 28 mol %, a combined methane and argon concentration of about 3 mol % to about 8 mol %, and an ammonia concentration of about 1 mol % to about 5 mol %.

26. The method according to any one of paragraphs 14 to 25, wherein the first ammonia product has an ammonia concentration of at least 95 mol %, a hydrogen concentration of up to about 5 mol %, a nitrogen concentration of up to about 2 mol %, a methane concentration of up to about 0.1 mol %, and an argon concentration of up to about 0.1 mol %.

27. The method according to any one of paragraphs 14 to 26, wherein the effluent has an ammonia concentration from a low of about 5 mol % to a high of about 15 mol %, a hydrogen concentration of about 40 mol % to about 60 mol %, a nitrogen concentration of about 10 mol % to about 23 mol %, and a combined amount of methane and argon of about 15 mol % to about 30 mol %.

28. The method according to any one of paragraphs 14 to 27, wherein the second recycle gas has an ammonia concentration of about 0.5 mol % to about 5 mol %, a hydrogen concentration of about 45 mol % to about 55 mol %, a nitrogen concentration of about 15 mol % to about 20 mol %, and a combined amount of methane and argon of about 20 mol % to about 30 mol %.

29. The method according to any one of paragraphs 22 to 28, wherein the mixed purge gas has a hydrogen concentration of about 50 mol % to about 70 mol %, a nitrogen concentration of about 15 mol % to about 22 mol %, an ammonia concentration of about 1 mol % to about 5 mol %, a methane concentration of about 5 mol % to about 25 mol %, and an argon concentration of about 5 mol % to about 25 mol %.

30. The method according to any one of paragraphs 14 to 29, wherein the second ammonia product has an ammonia concentration of about 90 mol % to about 99.99 mol %, a hydrogen concentration of about 0.001 mol % to about 5 mol %, a nitrogen concentration of about 0.001 mol % to about 2 mol %, a methane concentration of about 0.0001 mol % to about 0.1 mol %, and an argon concentration of about 0.0001 mol % to about 0.1 mol %.

31. The method according to any one of paragraphs 20 to 30, wherein the mixed ammonia product has an ammonia concentration of at least 90 mol %, at least 95 mol %, at least 97 mol %, or at least 99 mol % to about 99.9 mol % or about 99.99 mol %, a hydrogen concentration of about 0.001 mol % to about 5 mol %, a nitrogen concentration of about 0.001 mol % to about 2 mol %, a methane concentration of about 0.0001 mol % to about 0.1 mol %, and an argon concentration of about 0.0001 mol % to about 0.1 mol %.

32. The method according to anyone of paragraphs 14 to 31, wherein an amount of the first purge gas is up to 60% of an amount of the syngas reacted in the first ammonia converter.

33. The method according to anyone of paragraphs 14 to 31, wherein an amount of the first purge gas is from about 5% to about 60% of an amount of the syngas reacted in the first ammonia converter.

34. The method according to anyone of paragraphs 14 to 31, wherein an amount of the first purge gas is from about 15% to about 40% of an amount of the syngas reacted in the first ammonia converter.

35. A method for producing ammonia, comprising: reforming a hydrocarbon to produce a syngas comprising hydrogen, nitrogen, carbon monoxide, carbon dioxide, methane, argon, and water; removing at least a portion of the carbon dioxide in the syngas to produce a carbon dioxide lean syngas; converting at least a portion of the carbon monoxide and at least a portion of any remaining carbon dioxide in the carbon dioxide lean syngas to methane to produce a converted syngas; separating at least a portion of the water and at least a portion of the nitrogen from the converted syngas to produce a purified syngas, wherein the purified syngas has a hydrogen to nitrogen molar ratio of about 2:1 to about 4:1; reacting the purified syngas in a first ammonia converter to produce a first ammonia product, a first recycle gas, and a first purge gas, wherein the first ammonia product comprises at least 90 mol % ammonia, wherein the first recycle gas comprises about 40 mol % to about 90 mol % hydrogen, about 10 mol % to about 40 mol % nitrogen, about 0.02 mol % to about 20 mol % methane, about 0.001 mol % to about 10 mol % argon, and about 0.001 mol % to about 15 mol % ammonia, and wherein the first purge gas is at a temperature of about −30° C. to about 50° C. and comprises about 40 mol % to about 90 mol % hydrogen, about 10 mol % to about 40 mol % nitrogen, about 0.002 mol % to about 15 mol % methane, about 0.001 mol % to about 5 mol % argon, and about 0.001 mol % to about 15 mol % ammonia; heating the first purge gas to produce a heated first purge gas at a temperature of about 100° C. to about 300° C.; reacting the heated first purge gas in a second ammonia converter to produce an effluent comprising about 1 mol % to about 40 mol % ammonia, about 20 mol % to about 80 mol % hydrogen, about 1 mol % to about 40 mol % nitrogen, about 1 mol % to about 35 mol % methane, and about 1 mol % to about 35 mol % argon; separating the effluent to produce a second ammonia product and a second purge gas, wherein the second ammonia product comprises at least 90 mol % ammonia, and wherein the second purge gas comprises about 20 mol % to about 80 mol % hydrogen, about 1 mol % to about 40 mol % nitrogen, about 1 mol % to about 35 mol % methane, about 1 mol % to about 35 mol % argon, and about 0.01 mol % to about 15 mol % ammonia; separating the second purge gas into a first portion and a second portion; recycling the first portion to the second ammonia converter; separating the second portion to produce a third ammonia product and a third purge gas, wherein the third ammonia product comprises at least 90 mol % ammonia, and wherein the third purge gas comprises less than 1 mol % ammonia; and mixing the first ammonia product, the second ammonia product, and the third ammonia product to produce a mixed ammonia product comprising at least 90 mol % ammonia.

36. The method according to paragraph 35, wherein the first ammonia converter produces the first ammonia product at a conversion rate of about 70% to about 90% of the purified syngas.

37. The method according to paragraph 35 or 36, wherein the first purge gas is heated by indirectly exchanging heat from the effluent to the first purge gas.

38. The method according to any one of paragraphs 35 to 37, further comprising recycling the first recycle gas to the purified syngas.

39. The method according to any one of paragraphs 35 to 38, further comprising recycling the first recycle gas to the purified syngas, wherein the first ammonia converter produces the first ammonia product at a conversion rate of about 70% to about 90% of the purified syngas, and wherein the first purge gas is heated by indirectly exchanging heat from the effluent to the first purge gas.

40. The method according to any one of paragraphs 14 to 39, wherein the first ammonia converter is a single-pass converter or a multi-pass converter.

41. The method according to any one of paragraphs 14 to 39, wherein the second ammonia converter is a single-pass converter or a multi-pass converter.

42. The method according to any one of paragraphs 14 to 39, wherein the first ammonia converter is single-pass converter, and wherein the second ammonia converter is a multi-pass converter.

43. The method according to any one of paragraphs 14 to 39, wherein the first ammonia converter is multi-pass converter, and wherein the second ammonia converter is a single-pass converter.

44. The method according to any one of paragraphs 14 to 39, wherein the first ammonia converter and the second ammonia converter are each a multi-pass converter.

45. The method according to any one of paragraphs 14 to 39, wherein the first ammonia converter and the second ammonia converter are each a single-pass converter.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A system for producing ammonia, comprising:
    a purification system adapted to purify a syngas by removal of one or more contaminants and excess nitrogen to obtain a first purge gas, the purification system comprising one or more cryogenic separators;
    a first ammonia converter in fluid communication with the purification system, the first ammonia converter adapted to react the syngas comprising hydrogen, nitrogen, and argon to produce a first ammonia product and a recycle gas, wherein the recycle gas comprises nitrogen, hydrogen, and argon;
    a second ammonia converter in fluid communication with the purification system, the second ammonia converter adapted to react the first purge gas to produce an effluent comprising ammonia and argon;
    a product separator in fluid communication with the second ammonia converter, the product separator adapted to separate the effluent to produce a second ammonia product comprising ammonia and a second purge gas comprising ammonia and argon; and
    an ammonia recovery unit in fluid communication with the product separator, the ammonia recovery unit adapted to separate at least a portion of the second purge gas to produce a third ammonia product comprising ammonia and a third purge gas essentially free of ammonia and comprising argon; wherein the first ammonia product, the second ammonia product, and the third ammonia product form a mixed ammonia product.

2. The system of claim 1, further comprising a heat exchanger in fluid communication with the second ammonia converte, the heat exchanger adapted to indirectly exchange heat from the effluent to at least a portion of the first purge gas.

3. The system of claim 1, further comprising a compressor in fluid communication with the first ammonia converter, the compressor adapted to compress at least a portion of the syngas.

4. The system of claim 1, further comprising a first recycle line in fluid communication with the first ammonia converter, the first recycle line adapted to recycle the recycle gas from the first ammonia converter to the syngas.

5. The system 4, further comprising a second recycle line in fluid communication with the product separator, the second recycle line configured to recycle at least a portion of the second purge gas to the first purge gas.

* * * * *